United States Patent
Sagara et al.

(10) Patent No.: US 12,528,493 B2
(45) Date of Patent: Jan. 20, 2026

(54) CONTROL DEVICE, CONTROL METHOD, AND STORAGE MEDIUM

(71) Applicant: HONDA MOTOR CO., LTD., Tokyo (JP)

(72) Inventors: Masafumi Sagara, Tokyo (JP); Yuki Hara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 18/541,823

(22) Filed: Dec. 15, 2023

(65) Prior Publication Data

US 2024/0208528 A1    Jun. 27, 2024

(30) Foreign Application Priority Data

Dec. 21, 2022  (JP) ................. 2022-204428

(51) Int. Cl.
| | |
|---|---|
| *B60G 17/015* | (2006.01) |
| *B60W 30/06* | (2006.01) |
| *B60W 30/095* | (2012.01) |
| *B60W 40/12* | (2012.01) |
| *B60W 50/14* | (2020.01) |
| *G05B 19/042* | (2006.01) |

(52) U.S. Cl.
CPC ........ *B60W 50/14* (2013.01); *B60W 30/0956* (2013.01); *B60W 2554/4029* (2020.02)

(58) Field of Classification Search
CPC ............ B60G 17/015; B60W 50/14; B60W 30/0956; B60W 2554/4029; B60W 30/06; B60W 2050/146; B60W 40/12; G05B 19/0423; G05B 2219/25257

USPC ............................................................. 701/1
See application file for complete search history.

(56) References Cited

U.S. PATENT DOCUMENTS

| | | | |
|---|---|---|---|
| 11,840,241 B1 * | 12/2023 | Barrett | ................ B60W 40/101 |
| 2020/0215867 A1 * | 7/2020 | Park | ..................... B60G 17/019 |
| 2021/0178845 A1 * | 6/2021 | Cho | ......................... G01S 19/42 |
| 2022/0194362 A1 | 6/2022 | Ueki et al. | |

FOREIGN PATENT DOCUMENTS

| | | | |
|---|---|---|---|
| JP | 2005-075015 A | | 3/2005 |
| JP | 2011-030140 A | | 2/2011 |
| JP | 2013035495 A | * | 2/2013 |
| JP | 2006298115 A | * | 11/2016 |
| JP | 2022-099048 A | | 7/2022 |

OTHER PUBLICATIONS

Aug. 6, 2024, Translation of Japanese Office Action issued for related JP Application No. 2022-204428.

* cited by examiner

*Primary Examiner* — Rachid Bendidi
*Assistant Examiner* — Hossam M Abd El Latif
(74) *Attorney, Agent, or Firm* — Paratus Law Group, PLLC

(57) ABSTRACT

A control device of a moving body, includes: an external environment recognition unit configured to acquire external environment recognition data of the moving body; a movement control unit configured to perform movement control of the moving body based on the external environment recognition data; and a moving body height detection unit configured to detect a moving body height of the moving body. The external environment recognition unit corrects the external environment recognition data in accordance with a change in the moving body height while the movement control is performed.

12 Claims, 13 Drawing Sheets

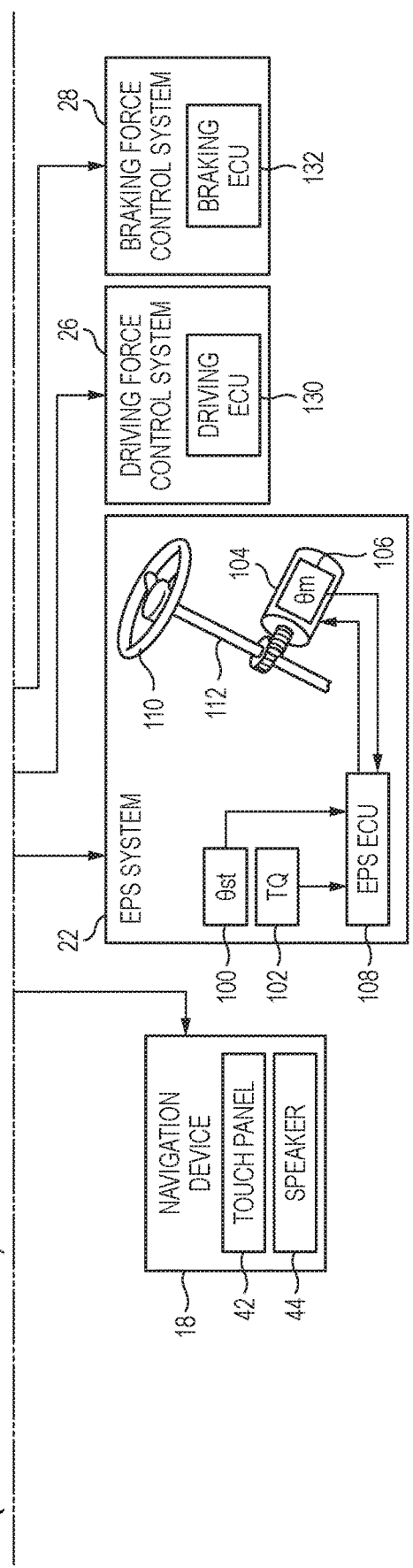

CONTROL DEVICE, CONTROL METHOD, AND STORAGE MEDIUM

This application is based upon and claims the benefit of priority from prior Japanese patent application No. 2022-204428, filed on Dec. 21, 2022, the entire contents of which are incorporated herein by reference.

TECHNICAL FIELD

The present disclosure relates to a control device, a control method, and a storage medium storing a control program.

BACKGROUND ART

In recent years, efforts have been actively made to provide access to a sustainable transportation system in consideration of vulnerable people among traffic participants. In order to implement the above, focus has been placed on research and development on further improving safety and convenience of traffic by research and development related to driving assistance technique.

In the related art, an automatic parking system that moves a vehicle to a target parking position acquired by a sensor such as a camera is known. There is also known a vehicle height adjustment system capable of adjusting a vehicle height through control by user operation or system control. For example, JP2006-298115A describes a driving assistance device in which when a road surface near a parking target area has large unevenness and a driver increases and registers a vehicle height, a suspension control device is driven based on vehicle height adjustment data registered at the same timing to set a vehicle height to the registered vehicle height. JP2013-035495A discloses a start assist device that includes a longitudinal acceleration sensor that detects an inclination state of a vehicle body, a road surface condition estimating unit that estimates an inclination degree of a road surface based on a detection result of the longitudinal acceleration sensor, and a vehicle height sensor that detects a vehicle height near wheels, and corrects the inclination degree of the road surface (vehicle body) estimated based on the detection result of the longitudinal acceleration sensor using the vehicle height detected by the vehicle height sensor.

SUMMARY

When a height of a vehicle changes, a position of a sensor mounted on the vehicle also changes. Therefore, different external environment recognition data of an external environment of the vehicle in accordance with the change of the position of the sensor is acquired. In this case, since there is also a difference in an external environment image generated based on the external environment recognition data, the control of automatic movement of the vehicle using the information may be affected. Therefore, it is desirable that there is no difference in the external environment recognition data of the external environment of the vehicle recognized by the sensor even when the vehicle height changes. According to the driving assistance device of JP2006-298115A, it is possible to adjust a vehicle height at the same timing as the past based on past travel history. According to the start assist device of JP2013-035495A, it is possible to correct an estimation value of the inclination degree of the road surface (vehicle body) based on the detected vehicle height. JP2006-298115A and JP2013-035495A do not describe different external environment recognition data acquired when the vehicle height changes during automatic movement of the vehicle and processing of the different external environment recognition data. Therefore, there is room for improvement in the related art in this regard.

Aspects of embodiments of the present disclosure relates to providing a control device, a control method, and a storage medium storing a control program capable of appropriately recognizing an external environment of a moving body even when a moving body height changes.

According to an aspect of the present disclosure, there is provided a control device of a moving body, the control device including:
an external environment recognition unit configured to acquire external environment recognition data of the moving body;
a movement control unit configured to perform movement control of the moving body based on the external environment recognition data; and
a moving body height detection unit configured to detect a moving body height of the moving body, in which
the external environment recognition unit corrects the external environment recognition data in accordance with a change in the moving body height while the movement control is performed.

According to another aspect of the present disclosure, there is provided a control method performed by a control device, the control device including an external environment recognition unit configured to acquire external environment recognition data of a moving body, a movement control unit configured to perform movement control of the moving body based on the external environment recognition data, and a moving body height detection unit configured to detect a moving body height of the moving body, the control method including:
correcting the external environment recognition data in accordance with a change in the moving body height while the movement control is performed.

According to another aspect of the present disclosure, there is provided a non-transitory computer readable storage medium storing a control program causing a processor of a control device to execute a process, the control device including an external environment recognition unit configured to acquire external environment recognition data of a moving body, a movement control unit configured to perform movement control of the moving body based on the external environment recognition data, and a moving body height detection unit configured to detect a moving body height of the moving body, the process including:
correcting the external environment recognition data in accordance with a change in the moving body height while the movement control is performed.

According to the present disclosure, it is possible to provide a control device, a control method, and a storage medium storing a control program capable of appropriately recognizing an external environment of a moving body even when a moving body height changes. The present disclosure may contribute to development of a sustainable transportation system accordingly.

BRIEF DESCRIPTION OF DRAWINGS

Exemplary embodiment(s) of the present invention will be described in detail based on the following figures, wherein.

DESCRIPTION OF EMBODIMENTS

Figure 1:
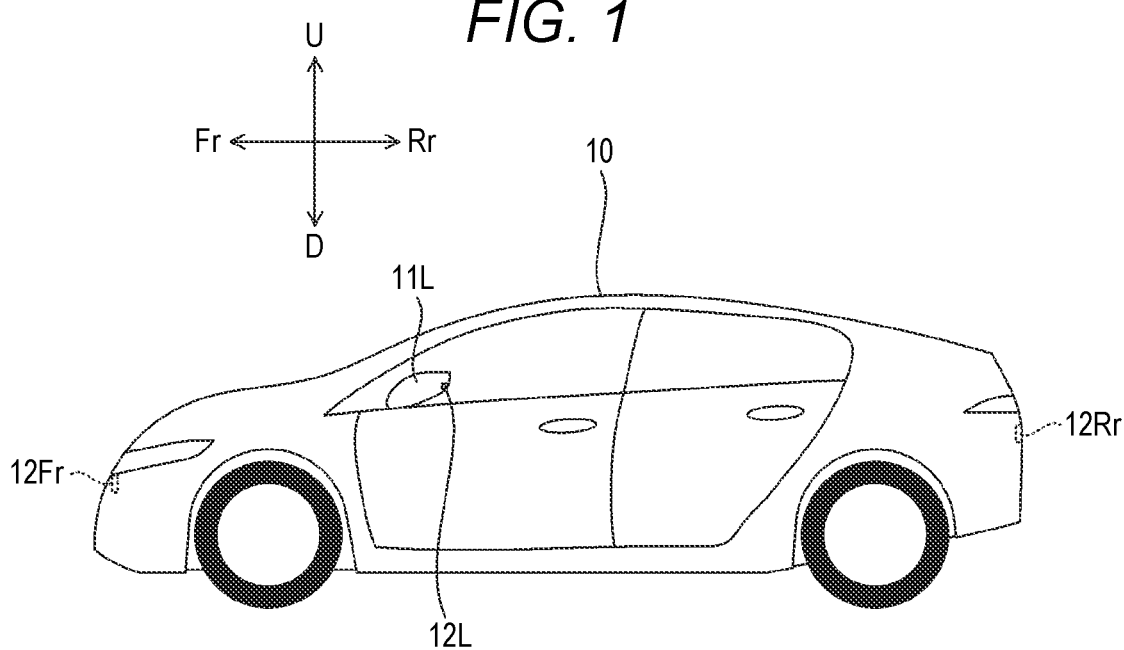
FIG. 1 is a side view of a vehicle on which a control device according to the present disclosure is mounted.

Hereinafter, an embodiment of a control device, a control method, and a storage medium storing a control program according to the present disclosure will be described with reference to the attached drawings. The drawings are viewed from directions of reference numerals. Further, in the present specification and the like, in order to simplify and clarify the description, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

(Vehicle 10 on which Control Device is Mounted)

Figure 2:
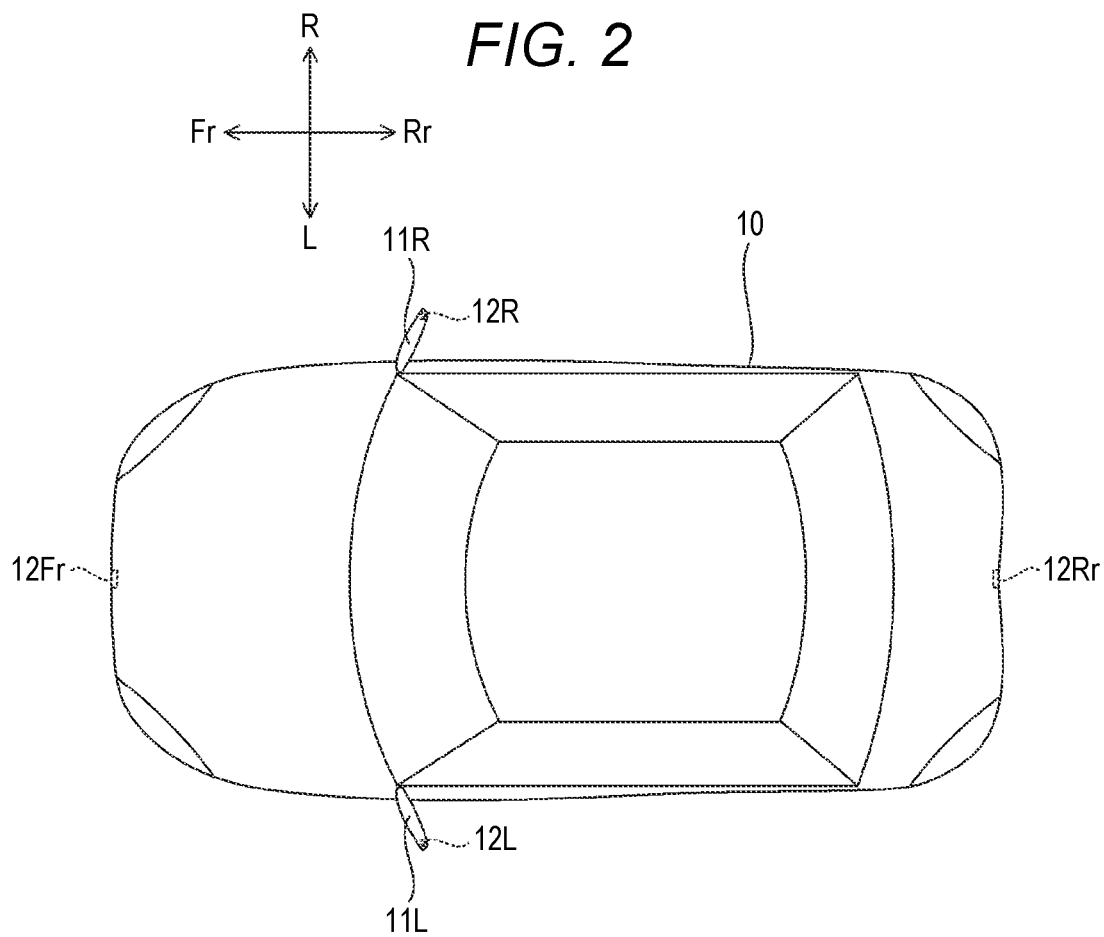
FIG. 2 is a top view of the vehicle shown in FIG. 1.

FIG. 1 is a side view of the vehicle 10 on which the control device according to the present disclosure is mounted. FIG. 2 is a top view of the vehicle 10 shown in FIG. 1. The vehicle 10 is an example of a moving body in the present disclosure.

The vehicle 10 is an automobile including a drive source (not shown), and wheels including drive wheels driven by power of the drive source and wheels that are steerable. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or may be a combination of an electric motor and an internal combustion engine. The drive source of the vehicle 10 may drive the pair of left and right front wheels, the pair of left and right rear wheels, or the four wheels including the pair of left and right front wheels and the pair of left and right rear wheels. Both the front wheels and the rear wheels may be the steerable steering wheels, or either one of the front wheels and the rear wheels may be the wheels that are steerable.

The vehicle 10 further includes side mirrors 11L and 11R. The side mirrors 11L and 11R are mirrors (back mirrors) that are provided on outer sides of front seat doors of the vehicle 10 and that are for a driver to check a rear side and rear lateral sides. Each of the side mirrors 11L and 11R is fixed to a main body of the vehicle 10 by a rotation shaft that extends in a perpendicular direction, and may opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and that images the front side of the vehicle 10. The rear camera 12Rr is a digital camera that is provided at a rear portion of the vehicle 10 and that images the rear side of the vehicle 10. The left side camera 12L is a digital camera that is provided at a left side mirror 11L of the vehicle 10 and that images the left side of the vehicle 10. The right side camera 12R is a digital camera that is provided at a right side mirror 11R of the vehicle 10 and that images the right side of the vehicle 10.

(Internal Configuration of Vehicle 10)

Figure 3:
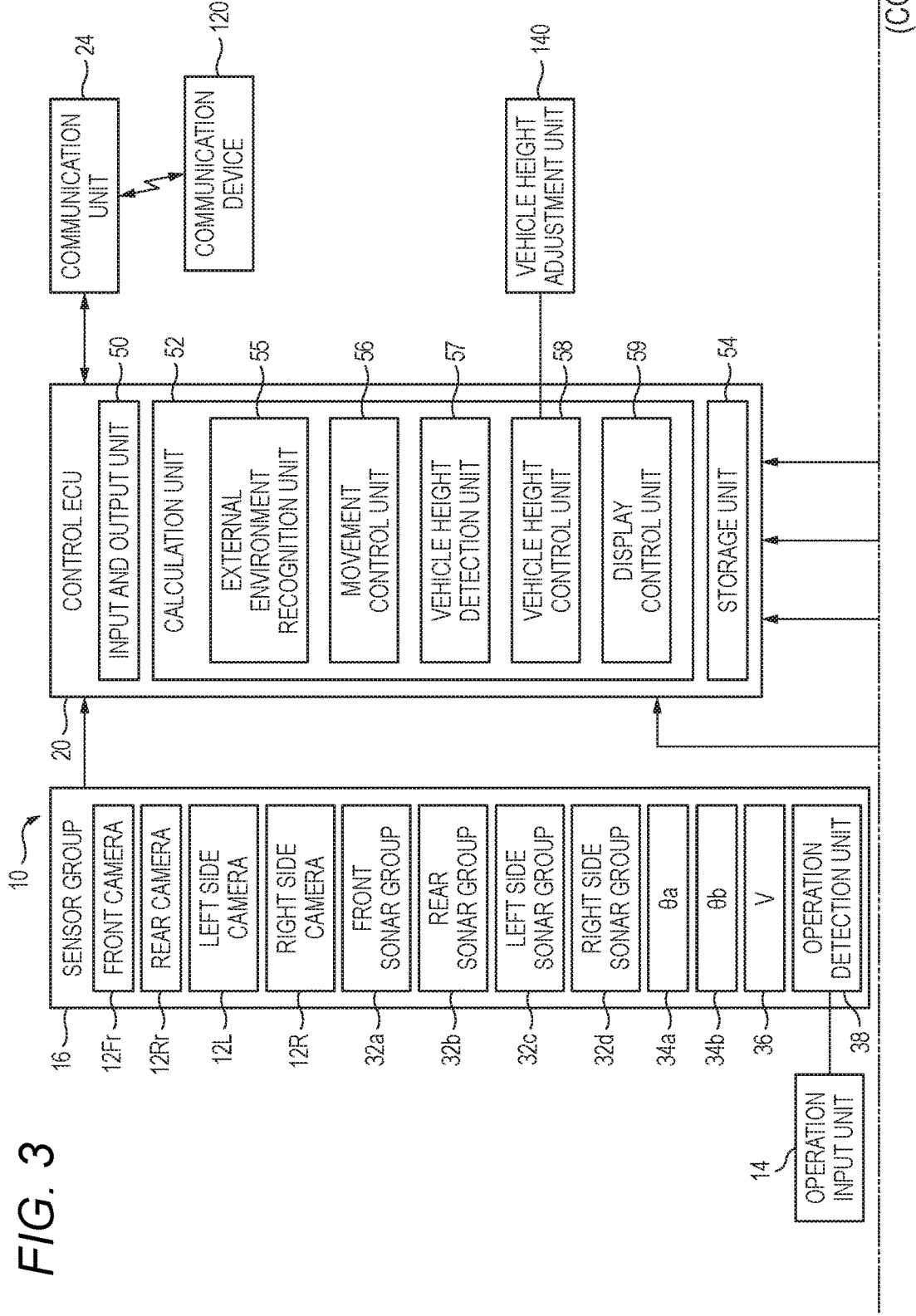
FIG. 3 is a block diagram showing an example of an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left side camera 12L, and the right side camera 12R. Further, the sensor group 16 includes a front sonar group 32a, a rear sonar group 32b, a left side sonar group 32c, and a right side sonar group 32d. Further, the sensor group 16 includes wheel sensors 34a and 34b, a vehicle speed sensor 36, and an operation detection unit 38.

The front camera 12Fr, the rear camera 12Rr, the left side camera 12L, and the right side camera 12R acquire external environment recognition data for recognizing surroundings of an external environment of the vehicle 10 by imaging the surroundings of the vehicle 10. Surrounding images of the vehicle 10 captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image. A surrounding image generated by combining imaging data of the front camera 12Fr, the rear camera 12Rr, the left side camera 12L, and the right side camera 12R may be referred to as a top view image of the vehicle 10. The front camera 12Fr, the rear camera 12Rr, the left side camera 12L, and the right side camera 12R output the acquired external environment recognition data to the control ECU 20.

The front sonar group 32a, the rear sonar group 32b, the left side sonar group 32c, and the right side sonar group 32d emit sound waves to the surroundings of the vehicle 10, and receive reflected sounds from other objects. The front sonar group 32a includes, for example, four sonars. The sonars that constitute the front sonar group 32a are provided on an obliquely left front side, a front left side, a front right side, and an obliquely right front side of the vehicle 10, respectively. The rear sonar group 32b includes, for example, four sonars. The sonars that constitute the rear sonar group 32b are provided on an obliquely left rear side, a rear left side, a rear right side, and an obliquely right rear side of the vehicle 10, respectively. The left side sonar group 32*c* includes, for example, two sonars. The sonars that constitute the left side sonar group 32*c* are provided at a left side front portion and a left side rear portion of the vehicle 10, respectively. The right side sonar group 32*d* includes, for example, two sonars. The sonars that constitute the right side sonar group 32*d* are respectively provided at a right side front portion and a right side rear portion of the vehicle 10. The front sonar group 32*a*, the rear sonar group 32*b*, the left side sonar group 32*c*, and the right side sonar group 32*d* output the received reflected sound from another object to the control ECU 20.

The wheel sensors 34*a* and 34*b* detect rotation angles of the wheels of the vehicle 10. The wheel sensors 34*a* and 34*b* may be implemented by angle sensors, or may be implemented by displacement sensors. The wheel sensors 34*a* and 34*b* output detection pulses every time the wheels are rotated by a predetermined angle. The detection pulses output from the wheel sensors 34*a* and 34*b* are used for calculating rotation angles of the wheels and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects operation content of a user performed using an operation input unit 14, and outputs the detected operation content to the control ECU 20. The operation input unit 14 includes various user interfaces such as a side mirror switch for switching between open and closed states of the side mirrors 11L and 11R, and a shift lever (selector lever or selector).

The navigation device 18 detects a current position of the vehicle 10 by using, for example, a global positioning system (GPS), and guides the user to a path to a destination. The navigation device 18 includes a storage device (not shown) including a map information database.

The navigation device 18 includes a touch panel 42 and a speaker 44. The touch panel 42 functions as an input device and a display device of the control ECU 20. The speaker 44 outputs various kinds of guidance information to the user (passenger) of the vehicle 10 by a sound.

The touch panel 42 is configured such that various commands may be input using the touch panel 42 to the control ECU 20. For example, the user may input a command related to movement assistance of the vehicle 10 via the touch panel 42. The movement assistance includes entry assistance and exit assistance of the vehicle 10. Further, the touch panel 42 is configured to display various screens related to control content of the control ECU 20. For example, a screen related to the movement assistance of the vehicle 10 is displayed on the touch panel 42. Specifically, an entry assistance button for requesting the entry assistance of the vehicle 10 and an exit assistance button for requesting the exit assistance of the vehicle 10 are displayed on the touch panel 42. The entry assistance button includes an automatic entry button for requesting entering a parking space by the automatic steering of the control ECU 20, and a guidance entry button for requesting guidance during entering a parking space by an operation of the driver. The exit assistance button includes an automatic exit button for requesting exiting a parking space by the automatic steering of the control ECU 20, and a guidance exit button for requesting guidance during exiting a parking space by an operation of the driver. A constituent element other than the touch panel 42, for example, an information terminal such as a smartphone or a tablet terminal may be used as an input device or a display device. In addition, a head-up display (HUD) may be used as a display device.

The control ECU 20 includes an input and output unit 50, a calculation unit 52, and a storage unit 54. The calculation unit 52 is implemented by, for example, a central processing unit (CPU). The calculation unit 52 performs various kinds of control by controlling units based on a program stored in the storage unit 54. Further, the calculation unit 52 inputs and outputs a signal from and to each unit connected to the control ECU 20 via the input and output unit 50. The calculation unit 52 is an example of the control device in the present disclosure.

The calculation unit 52 includes an external environment recognition unit 55 that acquires external environment recognition data for recognizing an external environment of the vehicle 10, a movement control unit 56 that performs movement control of the vehicle 10 based on the external environment recognition data, a vehicle height detection unit 57 that detects a vehicle height of the vehicle 10, a vehicle height control unit 58 that performs vehicle height control, and a display control unit 59 that displays an image based on the external environment recognition data.

The external environment recognition unit 55 acquires external environment recognition data of the vehicle 10 acquired by the sensor group 16 from the sensor group 16. When the vehicle height of the vehicle 10 changes during execution of the movement control of the vehicle 10, the external environment recognition unit 55 corrects the external environment recognition data in accordance with the change in a vehicle height. The vehicle height of the vehicle 10 is changed by the vehicle height control performed by the vehicle height control unit 58 during the execution of the movement control. The change in the vehicle height may include, for example, a change in a vehicle height caused by a tire of the vehicle 10 riding on an object during the execution of the movement control, in addition to the change in the vehicle height caused by the vehicle height control of the vehicle height control unit 58. The vehicle height control performed by the vehicle height control unit 58 is, for example, control 30) of an air suspension, a hydraulic suspension, or the like. The vehicle height control is not limited to the air suspension and the hydraulic suspension as long as the vehicle height may be adjusted.

When the vehicle height of the vehicle 10 changes, a position (height) of the sensor group 16 mounted on a body of the vehicle 10 also changes in accordance with the change in the vehicle height. However, even when the position of the sensor group 16 changes, a sensing angle of the sensor group 16 does not change and is constant. Therefore, when the position of the sensor group 16 changes, a deviation occurs in the external environment recognition data acquired by the sensor group 16. Therefore, the external environment recognition unit 55 corrects the external environment recognition data in order to restore a position of a recognition target object in the external environment recognition data that is changed due to the change in the vehicle height, to the position of the recognition target object in the external environment recognition data before the change in the vehicle height.

For example, when the vehicle height of the vehicle 10 changes and decreases, the external environment recognition unit 55 corrects the external environment recognition data in a direction in which a target object represented by the external environment recognition data approaches the vehicle 10. In contrast, when the vehicle height of the vehicle 10 changes and increases, the external environment recognition unit 55 corrects the external environment recognition data in a direction in which the target object represented by the external environment recognition data moves away from the vehicle 10. The target object is a surrounding target object that exists around the vehicle 10 at the time of automatic entry and automatic exit of the vehicle 10. For example, the target object includes a recognition target object on a movement route of the vehicle 10 that may affect the movement control of the vehicle 10. For example, in a case where the image generated based on the external environment recognition data is a top view image of the surroundings of the vehicle, when the vehicle height decreases, the external environment recognition unit 55 corrects the external environment recognition data such that the top view image is reduced centering on the vehicle 10. In addition, when the vehicle height increases, the external environment recognition unit 55 corrects the external environment recognition data such that the top view image is enlarged centering on the vehicle 10.

The movement control unit 56 performs the movement assistance of the vehicle 10 by the automatic steering for automatically operating a steering 110 under control of the movement control unit 56. The movement assistance of the vehicle 10 includes automatic entry assistance for assisting automatic entry of the vehicle 10 and automatic exit assistance for assisting automatic exit of the vehicle 10. In the assistance control of the automatic steering, an accelerator pedal (not shown), a brake pedal (not shown), and the operation input unit 14 are automatically operated. Further, the movement control unit 56 performs guidance entry assistance and guidance exit assistance when the vehicle 10 is manually caused to entry and exit a parking space by operating the accelerator pedal, the brake pedal, and the operation input unit 14 by the user.

For example, the movement control unit 56 performs automatic entry control for allowing the vehicle 10 to enter a designated predetermined target position and automatic exit control for allowing the vehicle 10 to exit the designated predetermined target position based on the external environment recognition data of the vehicle 10 acquired by the front camera 12Fr, the rear camera 12Rr, the left side camera 12L, and the right side camera 12R and the predetermined parking position designated by the user. When the vehicle height of the vehicle changes and the external environment recognition data is corrected by the external 10 environment recognition unit 55 in accordance with the change, the movement control unit 56 performs the movement control of the vehicle 10 based on the corrected external environment recognition data. The predetermined target position includes a normal vacant parking space in which the vehicle 10 may be parked (enter/exit) and a registered parking space (registered target position) registered in the storage unit 54. The registered target position is a specific target position taken by the user, for example, a parking position where the user frequently parks the vehicle 10. The registered target position includes, for example, a monthly parking lot, a home parking lot, and a coin-operated parking lot with high parking frequency. The registered target position is detected by comparing feature points of the target position acquired from sensing data of the camera, the sonar, and the radar.

A vehicle height adjustment unit 140 capable of adjusting a vehicle height of the vehicle 10 is connected to the vehicle height control unit 58. The vehicle height adjustment unit 140 is constituted by, for example, an air suspension, a hydraulic suspension, or the like. The vehicle height control unit 58 outputs a vehicle height control signal for controlling the vehicle height of the vehicle 10 to the vehicle height adjustment unit 140. The vehicle height adjustment unit 140 adjusts the vehicle height of the vehicle 10 based on the vehicle height control signal.

The vehicle height detection unit 57 detects the vehicle height of the vehicle 10 based on elapsed time from the start of the vehicle height control performed by the vehicle height control unit 58. For example, the vehicle height detection unit 57 may calculate the amount of change in the vehicle height based on the elapsed time from the start of the vehicle height adjustment performed by the air suspension and estimate a current vehicle height of the vehicle 10. Alternatively, the vehicle height detection unit 57 may detect the current vehicle height of the vehicle 10 based on a feedback value of the adjustment amount from the vehicle height adjustment unit 140.

The vehicle height control unit 58 executes vehicle height control for controlling the vehicle height of the vehicle 10 in accordance with the progress of movement control for moving the vehicle 10 to the target position. The vehicle height of the vehicle 10 includes a vehicle height of an uppermost portion of the vehicle 10 and a vehicle height of a lowermost portion of the vehicle 10. The lowermost portion of the vehicle 10 refers to a minimum ground clearance of the vehicle 10 excluding a ground contact portion such as tires.

For example, the vehicle height control unit 58 starts the vehicle height control for controlling the vehicle height of the vehicle 10 in response to the completion of the movement control for moving the vehicle 10 to the target position or the completion of the movement control for moving the vehicle 10 from the target position. The completion of the movement control includes, for example, the time immediately before the completion of the movement control in a state in which the vehicle 10 moving under the movement control hardly moves, in addition to the time when the movement control is completed. The movement control for moving the vehicle 10 to the target position is automatic entry assistance control by the movement control unit 56. The movement control for moving the vehicle 10 from the target position is automatic exit assistance control by the movement control unit 56.

The vehicle height control unit 58 determines whether the vehicle height control is possible during the execution of the movement control for moving the vehicle 10 to the target position or the movement control for moving the vehicle 10 from the target position, and starts the vehicle height control for controlling the vehicle height of the vehicle 10 according to a determination result. Whether the vehicle height control is possible means, for example, whether the vehicle height control is possible from a vehicle height of the vehicle 10 suitable for moving the vehicle 10 to the target position to a vehicle height of the vehicle 10 suitable for the user to get on and off the vehicle 10 during the movement control for moving the vehicle 10 to the target position. Whether the vehicle height control is possible means whether the vehicle height control is possible from a vehicle height of the vehicle 10 suitable for moving the vehicle 10 from the target position to a vehicle height of the vehicle 10 suitable for normal traveling of the vehicle 10 during the movement control for moving the vehicle 10 from the target position.

During the execution of the movement control for moving the vehicle 10 to the target position, the vehicle height control unit 58 starts the vehicle height control for controlling the vehicle height of the vehicle 10 in accordance with an acquisition state of the external environment recognition data of the vehicle 10 acquired by the front camera 12Fr, the rear camera 12Rr, the left side camera 12L, and the right side camera 12R. For example, the vehicle height control unit 58 starts the vehicle height control when it is possible to acquire the external environment recognition data to the extent that the movement control of the vehicle 10 may be completed, that is, it is possible to acquire the sensing data to the extent that the movement control may be performed by odometry thereafter, and it is possible to perform self-position estimation of estimating a current relative position of the vehicle 10 with respect to the target position. When the vehicle height control of the vehicle 10 is performed during the movement, an error may occur in the sensing by the camera. However, in a case where the acquisition of the sensing data is completed and the self-position estimation is possible, the movement control may be performed by odometry thereafter, and thus the vehicle height control may be performed even during the movement of the vehicle 10.

The vehicle height control unit 58 executes first vehicle height control for controlling the vehicle height of the vehicle 10 based on the external environment recognition data of the vehicle 10 before starting the movement control for moving the vehicle 10 to the target position, and starts second vehicle height control for controlling the vehicle 10 to a vehicle height different from the vehicle height under the first vehicle height control in response to the completion of the movement control or during the execution of the movement control. The first vehicle height control is vehicle height control of the vehicle 10 to a vehicle height at which the movement control of the vehicle 10 to a target position is possible. For example, the first vehicle height control is control to a vehicle height at which safe movement control may be performed in consideration of a state of a road surface such as a speed bump (for example, a bump on a road of a parking lot for speed reduction) in the parking lot, a height of a ceiling of the parking lot, and a recognition result of other obstacles. The second vehicle height control is vehicle height control of the vehicle 10 to a vehicle height more suitable for the user of the vehicle 10 to get on and off than the vehicle height at which the movement control of the vehicle 10 to the target position is possible. The vehicle height suitable for the user to get on and off may be a vehicle height determined in advance according to the vehicle type or may be a vehicle height set in advance by the user. The height of the speed bump, the height of the ceiling, and the like are detected by image analysis of the external environment recognition data acquired by a camera or the like.

The vehicle height control unit 58 stores the vehicle height of the vehicle 10 before starting the first vehicle height control when the movement control (automatic exit assistance control) for moving the vehicle 10 from the target position is executed, and executes the vehicle height control of the vehicle 10 to the stored vehicle height in response to the completion of the movement control for moving the vehicle 10 from the target position. The vehicle height of the vehicle 10 before starting the first vehicle height control is the vehicle height of the vehicle 10 when the vehicle 10 normally travels.

The display control unit 59 displays an image based on the external environment recognition data corrected in accordance with the change in the vehicle height of the vehicle 10. The image based on the external environment recognition data is a surrounding image of the surroundings of the vehicle 10 generated from the external environment recognition data. The image based on the external environment recognition data includes, for example, a top view image of the surroundings of the vehicle 10. The display control unit 59 displays an image of a target position of the movement control, an image of a surrounding target object of the vehicle 10, and the like based on the external environment recognition data. The display control unit 59 displays an image on the touch panel 42 of the navigation device 18 or an information terminal such as a smartphone.

The "parking" is synonymous with, for example, "parking the moving body". For example, the "parking" is a stop as an occupant gets on and off the vehicle, and excludes a temporary stop due to a traffic signal or the like. The "target position" is a parking position at which the moving body is parked. Further, the "parking position" is a position where the moving body is stopped, that is, a position where the moving body is parked.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby enabling the occupant to perform operation assistance of the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 may perform wireless communication with another communication device 120. The other communication device 120 is a base station, a communication device of another vehicle, an information terminal such as a smartphone carried by the passenger of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown).

(Processing of Calculation Unit 52 at the Time of Entry)

Figure 4:
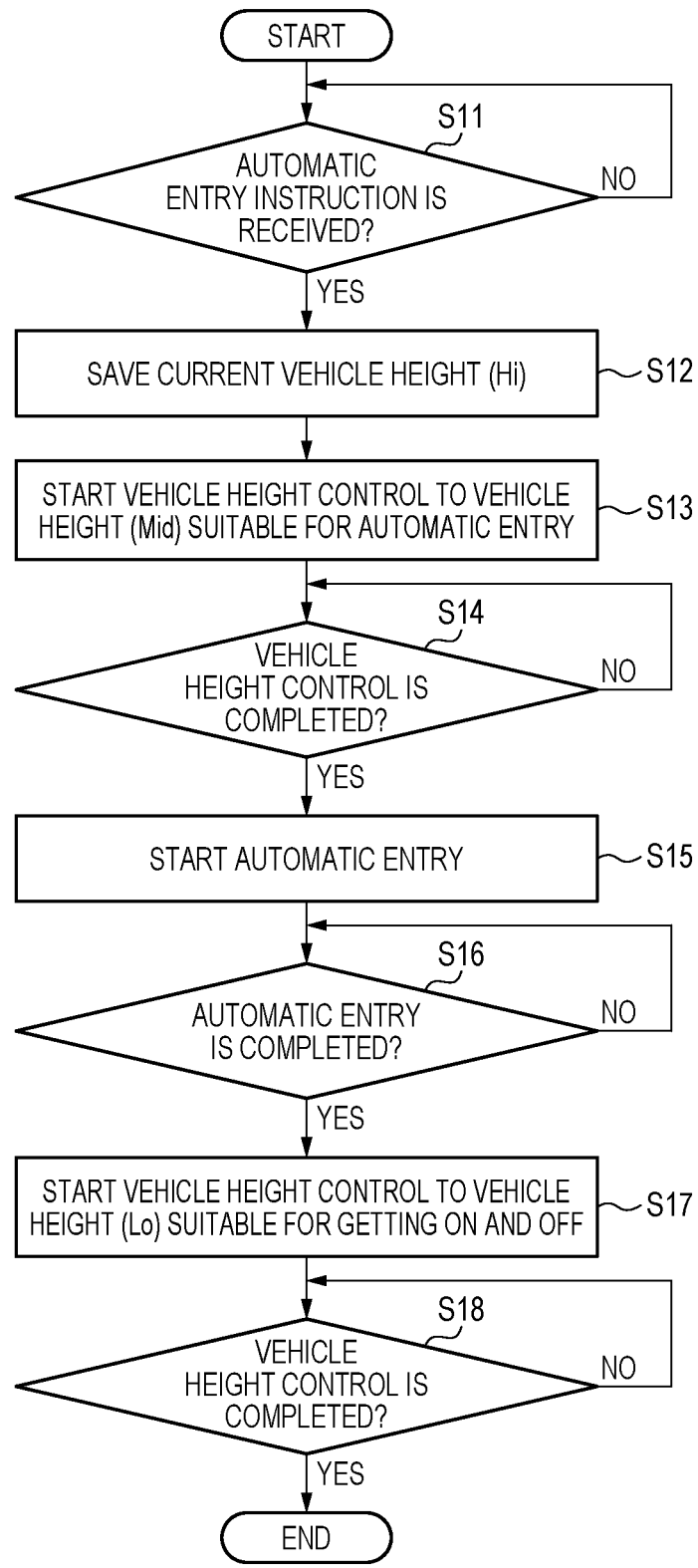
FIG. 4 is a flowchart showing an example of entry processing performed by a calculation unit.

Next, entry processing of the calculation unit 52 of the vehicle 10 at the time of automatic entry will be described. FIG. 4 is a flowchart showing an example of the entry processing performed by the calculation unit 52. Upon receiving an entry start operation from the user, the calculation unit 52 starts the processing shown in FIG. 4. The entry start operation is, for example, an operation of designating a predetermined parking position (target position) at which the vehicle 10 is parked and then touching an automatic entry button in the image of the parking lot displayed on the touch panel 42 of the navigation device 18 or an information terminal such as a smartphone. The entry start operation is performed, for example, when the vehicle 10 arrives near a parking lot where the vehicle 10 is parked.

First, the calculation unit 52 determines whether an automatic entry instruction for starting automatic entry of the vehicle 10 is received (step S11). The automatic entry instruction is, for example, the entry start operation.

In step S11, in a case where the automatic entry instruction is not received (step S11: No), the calculation unit 52 repeats the processing in step S11. In step S11, in a case where the automatic entry instruction is received (step S11: Yes), the calculation unit 52 stores a current vehicle height (Hi) of the vehicle 10 in the storage unit 54 (step S12). The current vehicle height (Hi) is the vehicle height of the vehicle 10 before the automatic entry is started, that is, the vehicle height of the vehicle 10 when the vehicle 10 normally travels. The vehicle height (Hi) will be further described later with reference to FIG. 8.

Next, the calculation unit 52 starts vehicle height control for controlling the vehicle height of the vehicle 10 so that the vehicle height of the vehicle 10 becomes a vehicle height (Mid) suitable for the automatic entry when the vehicle 10 automatically enters the designated target position (step S13). The vehicle height (Mid) suitable for the automatic entry is, for example, a vehicle height at which the lowermost portion of the vehicle 10 does not contact the speed bump in the parking lot and a vehicle height at which the uppermost portion of the vehicle 10 does not contact the ceiling of the parking place when the vehicle 10 enters the parking lot. The vehicle height (Mid) will be further described later with reference to FIG. 8.

Next, the calculation unit 52 determines whether the vehicle height control of the vehicle 10 started in step S13 is completed (step S14). The processing of steps S12, S13, and S14 is executed by the vehicle height control unit 58 of the calculation unit 52.

In step S14, in a case where the vehicle height control of the vehicle 10 is not completed (step S14: No), the calculation unit 52 repeats the processing in step S14 until the vehicle height control is completed. In step S14, in a case where the vehicle height control of the vehicle 10 is completed (step S14: Yes), the calculation unit 52 starts the automatic entry control for allowing the vehicle 10 to automatically enter the target position (step S15).

Next, the calculation unit 52 determines whether the automatic entry of the vehicle 10 started in step S15 is completed (step S16). The processing of steps S15 and S16 is executed by the movement control unit 56 of the calculation unit 52.

In step S16, in a case where the automatic entry of the vehicle 10 is not completed (step S16: No), the calculation unit 52 repeats the processing in step S16 until the automatic entry is completed. In step S16, in a case where the automatic entry of the vehicle 10 is completed (step S16: Yes), the calculation unit 52 starts the vehicle height control for controlling the vehicle height of the vehicle 10 so that the vehicle height of the vehicle 10 becomes a vehicle height (Lo) suitable for the user to get on and off the vehicle 10 (step S17). The vehicle height (Lo) will be further described later with reference to FIG. 8.

Next, the calculation unit 52 determines whether the vehicle height control of the vehicle 10 started in step S17 is completed (step S18). The processing of steps S17 and S18 is executed by the vehicle height control unit 58 of the calculation unit 52.

In step S18, in a case where the vehicle height control of the vehicle 10 is not completed (step S18: No), the calculation unit 52 repeats the processing in step S18 until the vehicle height control is completed. In step S18, in a case where the vehicle height control of the vehicle 10 is completed (step S18: Yes), the calculation unit 52 ends the entry processing.

As described above, in the entry processing of allowing the vehicle 10 to automatically enter the target position such as a parking place, the vehicle height control unit 58 of the calculation unit 52 controls the vehicle height of the vehicle 10 to the vehicle height (Mid) suitable for the automatic entry at the time of the automatic entry and controls the vehicle height of the vehicle 10 to the vehicle height (Lo) suitable for the user to get on and off in response to the completion of the automatic entry. Accordingly, it is possible to control the vehicle height of the vehicle 10 to an appropriate vehicle height in accordance with an entry state of the vehicle 10, and thus, for example, the convenience for the user to get on and off the vehicle 10 is improved.

(Processing of the Calculation Unit 52 at the Time of Exit)

Figure 5:
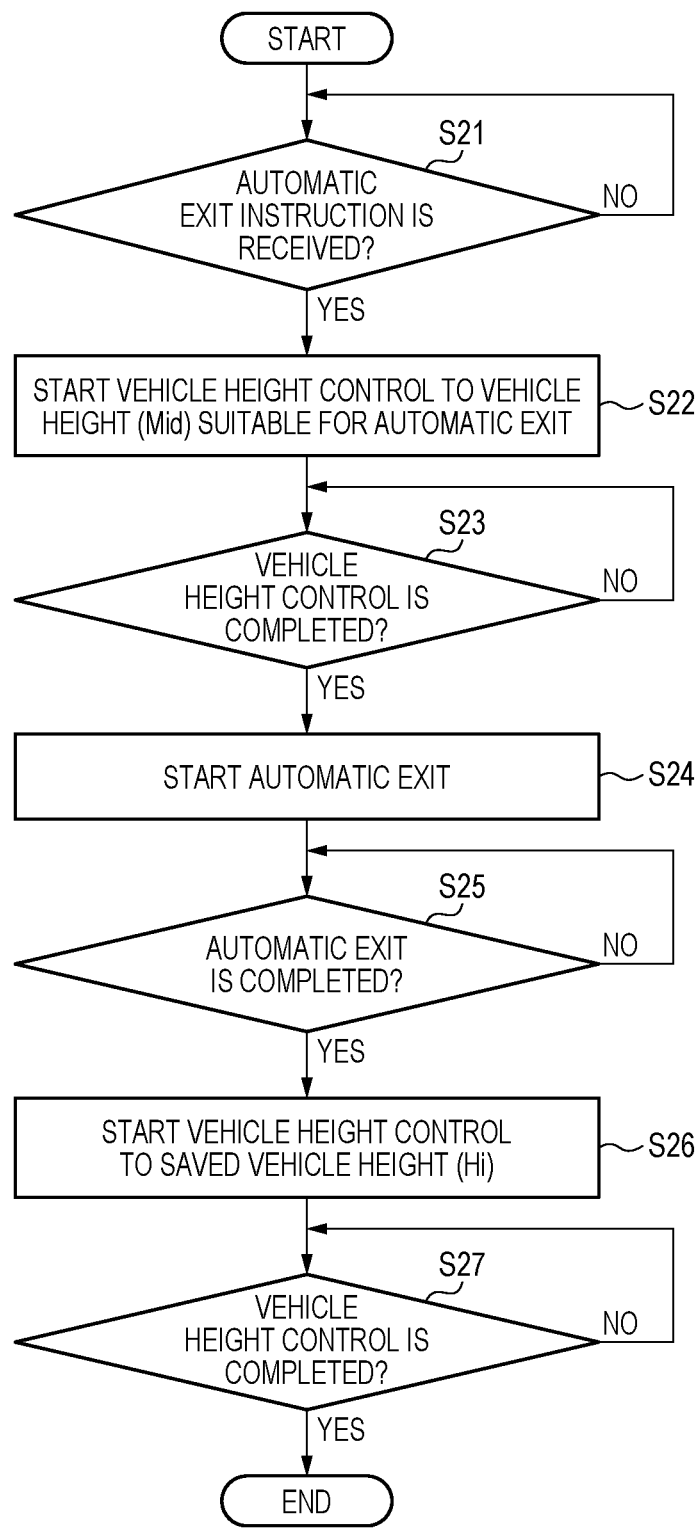
FIG. 5 is a flowchart showing an example of exit processing performed by the calculation unit.

Next, exit processing of the calculation unit 52 of the vehicle 10 at the time of automatic exit will be described. FIG. 5 is a flowchart showing an example of the exit processing performed by the calculation unit 52. Upon receiving an exit start operation from the user, the calculation unit 52 starts the processing shown in FIG. 5. The exit start operation is performed, for example, when the vehicle 10 automatically exits the parking position where the vehicle 10 is parked. The exit start operation is, for example, an operation of designating a direction in which the vehicle 10 exits from the target position where the vehicle 10 has entered, for example, a left front/right front direction, a left rear/right rear direction, or the like, and then touching an automatic exit button in the image of the parking lot displayed on the touch panel 42 or the information terminal.

First, the calculation unit 52 determines whether an automatic exit instruction for starting automatic exit of the vehicle 10 is received (step S21). The automatic exit instruction is, for example, the exit start operation.

In step S21, in a case where the automatic exit instruction is not received (step S21: No), the calculation unit 52 repeats the processing in step S21. In step S21, in a case where the automatic exit instruction is received (step S21: Yes), the calculation unit 52 starts the vehicle height control for controlling the vehicle height of the vehicle 10 so that the vehicle height of the vehicle 10 becomes a vehicle height (Mid) suitable for the automatic exit when the vehicle 10 automatically exits from the designated target position (step S22). The vehicle height (Mid) suitable for the automatic exit is, for example, a vehicle height at which the lowermost portion of the vehicle 10 does not contact the speed bump in the parking lot and a vehicle height at which the uppermost portion of the vehicle 10 does not contact the ceiling of the parking place when the vehicle 10 exits the parking lot. The vehicle height (Mid) will be further described later with reference to FIG. 9.

Next, the calculation unit 52 determines whether the vehicle height control of the vehicle 10 started in step S22 is completed (step S23). The processing of steps S22 and S23 is executed by the vehicle height control unit 58 of the calculation unit 52.

In step S23, in a case where the vehicle height control of the vehicle 10 is not completed (step S23: No), the calculation unit 52 repeats the processing in step S23 until the vehicle height control is completed. In step S23, in a case where the vehicle height control of the vehicle 10 is completed (step S23: Yes), the calculation unit 52 starts the automatic exit control for allowing the vehicle 10 to automatically exit from the target position (step S24).

Next, the calculation unit 52 determines whether the automatic exit of the vehicle 10 started in step S24 is completed (step S25). The processing of steps S24 and S25 is executed by the movement control unit 56 of the calculation unit 52.

In step S25, in a case where the automatic exit of the vehicle 10 is not completed (step S25: No), the calculation unit 52 repeats the processing in step S25 until the automatic exit is completed. In step S25, in a case where the automatic exit of the vehicle 10 is completed (step S25: Yes), the calculation unit 52 starts the vehicle height control for controlling the vehicle height of the vehicle 10 so that the vehicle height of the vehicle 10 becomes a vehicle height (Hi) of the vehicle 10 stored in the storage unit 54 when the vehicle 10 enters the target position (step S26). The vehicle height (Hi) will be further described later with reference to FIG. 9.

Next, the calculation unit 52 determines whether the vehicle height control of the vehicle 10 started in step S26 is completed (step S27). The processing of steps S26 and S27 is executed by the vehicle height control unit 58 of the calculation unit 52.

In step S27, in a case where the vehicle height control of the vehicle 10 is not completed (step S27: No), the calculation unit 52 repeats the processing in step S27 until the vehicle height control is completed. In step S27, in a case where the vehicle height control of the vehicle 10 is completed (step S27: Yes), the calculation unit 52 ends the entry processing. Since the automatic exit of the vehicle 10 is completed, the user may start the travel of the vehicle 10 without waiting for the completion of the vehicle height control of the vehicle 10.

As described above, in the exit processing of allowing the vehicle 10 to automatically exit from the target position such as a parking place, the vehicle height control unit 58 of the calculation unit 52 controls the vehicle height of the vehicle 10 to the vehicle height (Mid) suitable for the automatic exit at the time of the automatic exit, and controls the vehicle height of the vehicle 10 to the vehicle height (Hi) of the vehicle 10 at the time of the normal traveling stored in the storage unit 54 when the vehicle 10 enters the parking place in response to the completion of the automatic exit. Accordingly, the vehicle height of the vehicle 10 may be controlled to an appropriate vehicle height according to an exit situation of the vehicle 10, and thus, for example, the vehicle height automatically returns to the original vehicle height (Hi) when the automatic exit is completed, and the user does not need to instruct the vehicle height adjustment, thereby improving the convenience.

(Modification of Processing of Calculation Unit 52 at the Time of Entry)

Figure 6:
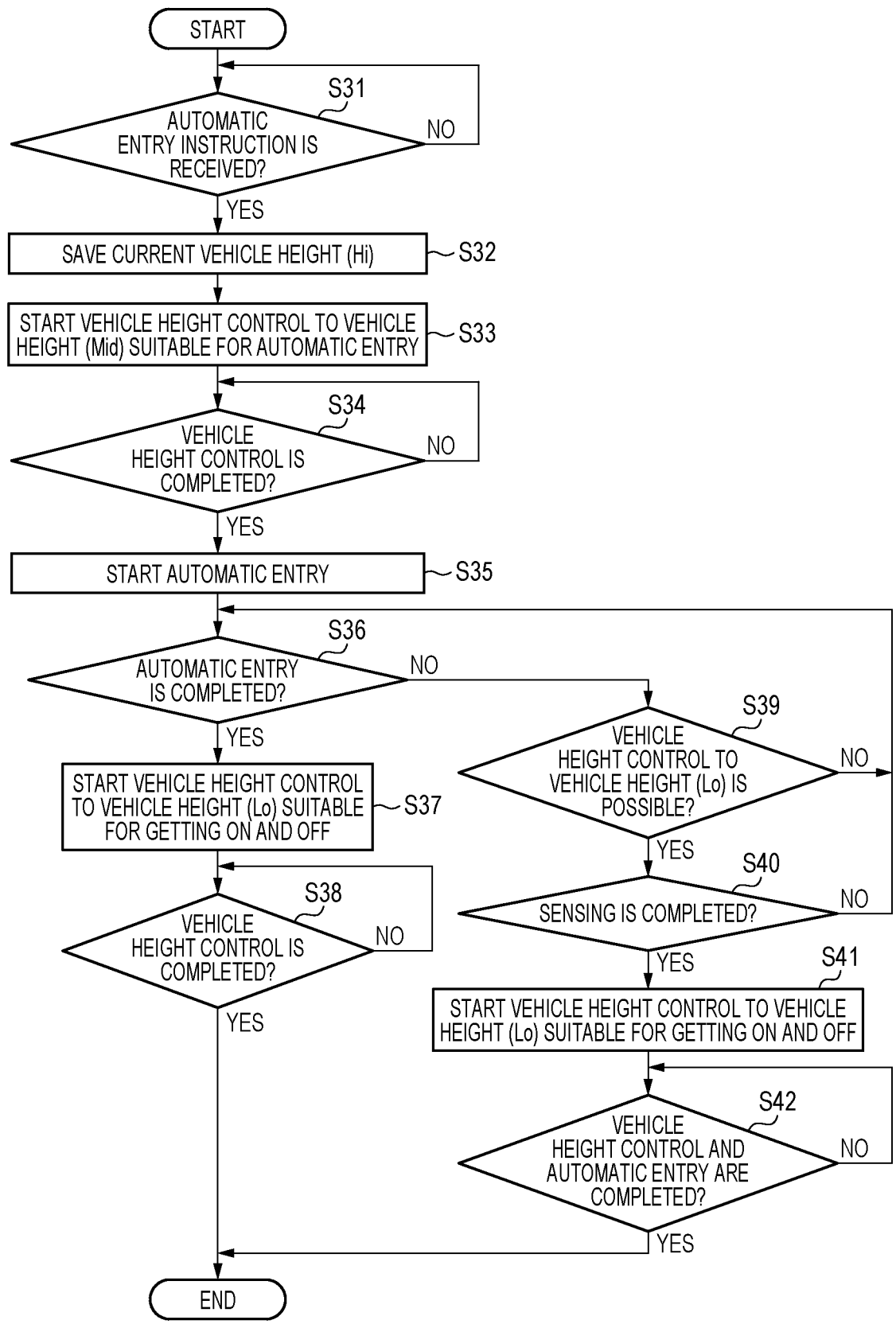
FIG. 6 is a flowchart showing a modification of the entry processing performed by the calculation unit.

Next, a modification of the entry processing of the calculation unit 52 of the vehicle 10 at the time of the automatic entry will be described. FIG. 6 is a flowchart showing a modification of the entry processing performed by the calculation unit 52. Upon receiving the entry start operation from the user, the calculation unit 52 starts the processing shown in FIG. 6 as in the entry processing in FIG. 4.

As shown in FIG. 6, in the modification of the entry processing, processing from step S31 to step S38 is the same as processing from step S11 to step S18 in the entry processing described in FIG. 4. Therefore, the description of steps S31 to S38 will be omitted.

In the modification of the entry processing, in a case where the automatic entry of the vehicle 10 is not completed in step S36 (step S36: No), the calculation unit 52 determines whether it is possible to perform the vehicle height control for controlling the vehicle height of the vehicle 10 so that the vehicle height of the vehicle 10 becomes a vehicle height (Lo) suitable for getting on and off when the user gets on and off the vehicle 10 (step S39). The state that the vehicle 10 may be controlled to the vehicle height (Lo) means that even when the vehicle height of the vehicle 10 is changed to the vehicle height (Lo), the vehicle 10 may enter the parking space without contacting the speed bump, that is, the vehicle 10 passes through a position of the speed bump existing in an entry path to the target position. The vehicle height (Lo) is the 20) same as the vehicle height (Lo) of the entry processing described in FIG. 4. The processing of step S39 is executed by the vehicle height control unit 58 of the calculation unit 52.

In step S39, in a case where the vehicle height control to the vehicle height (Lo) is not possible (step S39: No), the calculation unit 52 returns to step S36 and repeats each processing. In step S39, when the vehicle height control to the vehicle height (Lo) is possible (step S39: Yes), the calculation unit 52 determines whether the sensing is completed (step S40). The state in which the sensing is completed means a state in which the external environment recognition data may be acquired to the extent that the automatic entry control may be completed by odometry, and a self-position of the vehicle 10 may be estimated with respect to the target position. The processing of steps S36 and S40 is executed by the movement control unit 56 of the calculation unit 52.

In step S40, in a case where the sensing is not completed (step S40: No), the calculation unit 52 returns to step S36 and repeats each processing. In step S40, in a case where the sensing is completed (step S40: Yes), the calculation unit 52 starts the vehicle height control for controlling the vehicle height of the vehicle 10 so that the vehicle height of the vehicle 10 becomes a vehicle height (Lo) suitable for getting on and off when the user gets on and off the vehicle 10 (step S41). The processing of step S41 is executed by the vehicle height control unit 58 of the calculation unit 52.

Next, the calculation unit 52 determines whether the vehicle height control of the vehicle 10 started in step S41 is completed, and determines whether the automatic entry of the vehicle 10 started in step S35 is completed (step S42). The processing of step S42 is executed by the vehicle height control unit 58 and the movement control unit 56 of the calculation unit 52.

In step S42, in a case where at least one of the vehicle height control of the vehicle 10 and the automatic entry control of the vehicle 10 is not completed (step S42: No), the calculation unit 52 repeats the processing in step S42 until the control is completed. In step S42, in a case where the vehicle height control of the vehicle 10 and the automatic entry control of the vehicle 10 are completed (step S42: Yes), the calculation unit 52 ends the entry processing. Either of the vehicle height control and the automatic entry control may be completed first.

As described above, according to the modification of the entry processing, the vehicle height control unit 58 controls the vehicle height of the vehicle 10 to the vehicle height (Lo) suitable for the user to get on and off when it is determined that the vehicle height control of the vehicle 10 is possible even during the control of the automatic entry of the vehicle 10 and it is determined that the sensing of the automatic entry is completed. Therefore, the vehicle height control of the vehicle 10 may be started before the entry to the target position is completed, and completion waiting time of the vehicle height (Lo) control after the entry to the target position is completed may be reduced, thereby improving the convenience.

Modification of Processing of the Calculation Unit 52 at the Time of Exit

Figure 7:
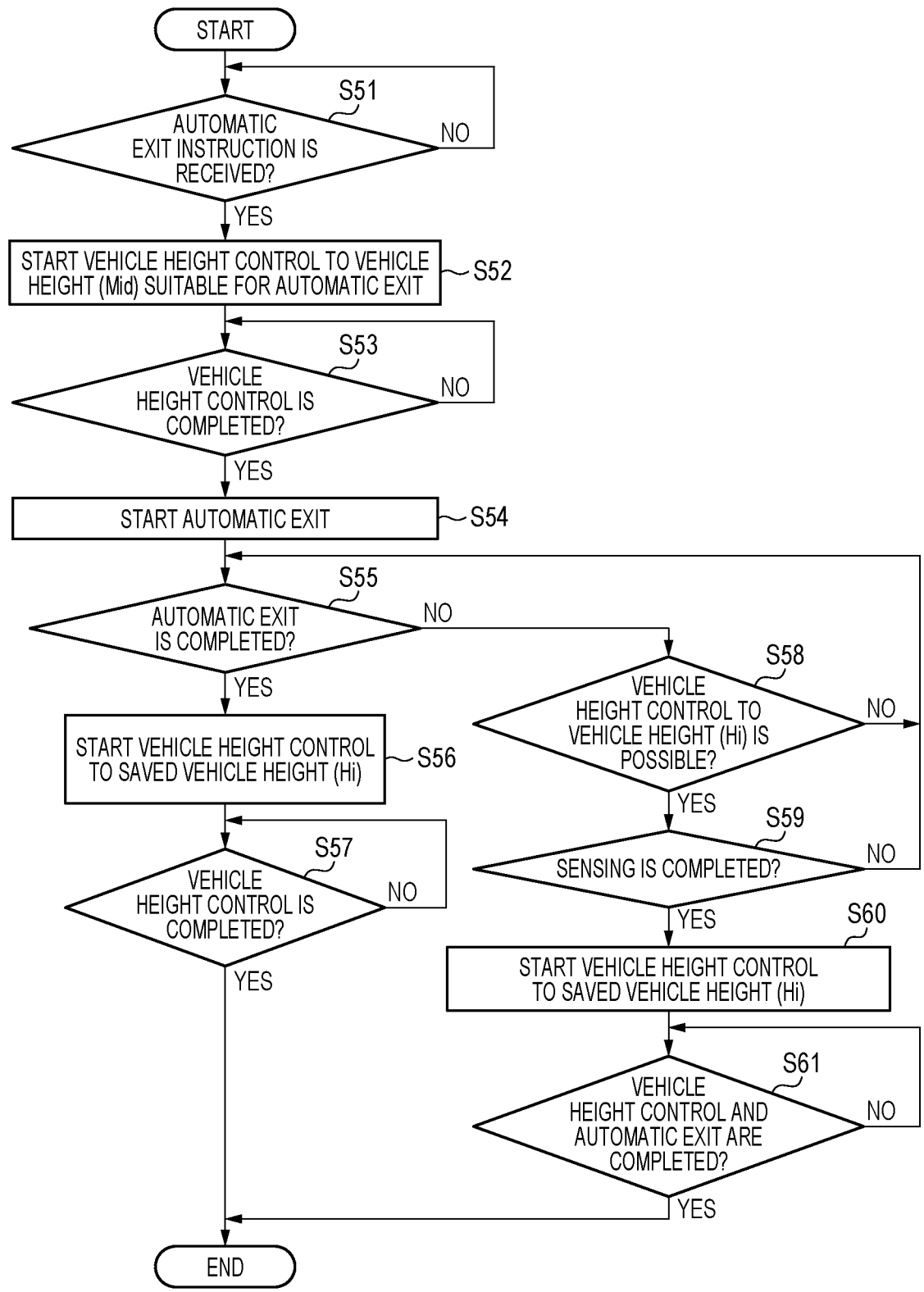
FIG. 7 is a flowchart showing a modification of the exit processing performed by the calculation unit.

Next, a modification of the exit processing of the calculation unit 52 at the time of the automatic exit of the vehicle 10 will be described. FIG. 7 is a flowchart showing a modification of the exit processing performed by the calculation unit 52. Upon receiving the exit start operation from the user, the calculation unit 52 starts the processing shown in FIG. 7 as in the exit processing in FIG. 5.

As shown in FIG. 7, in the modification of the exit processing, processing from step S51 to step S57 is the same as processing from step S21 to step S27 in the exit processing described in FIG. 5. Therefore, the description of steps S51 to S57 will be omitted.

In the modification of the exit processing, in a case where the automatic exit of the vehicle 10 is not completed in step S55 (step S55: No), the calculation unit 52 determines whether it is possible to perform the vehicle height control for controlling the vehicle height of the vehicle 10 so that the vehicle height of the vehicle 10 becomes a vehicle height (Hi) when the vehicle 10 normally travels (step S58). The state that the vehicle 10 may be controlled to the vehicle height (Hi) means that the vehicle 10 may exit the parking place without contacting the ceiling even when the vehicle height of the vehicle 10 is changed to the vehicle height (Hi), that is, the vehicle 10 has left a position where the ceiling of the parking place exists. The vehicle height (Hi) is the same as the vehicle height (Hi) of the exit processing described in FIG. 5. The processing of step S58 is executed by the vehicle height control unit 58 of the calculation unit 52.

In step S58, in a case where the vehicle height control to the vehicle height (Hi) is not possible (step S58: No), the calculation unit 52 returns to step S55 and repeats each processing. In step S58, in a case where the vehicle height control to the vehicle height (Hi) is possible (step S58: Yes), the calculation unit 52 determines whether the sensing is completed (step S59). The state in which the sensing is completed means a state in which the external environment recognition data may be acquired to the extent that the automatic exit control may be completed by odometry, and a self-position of the vehicle 10 may be estimated with respect to a stop position of an exit destination. The processing of steps S55 and S59 is executed by the movement control unit 56 of the calculation unit 52.

In step S59, in a case where the sensing is not completed (step S59: No), the calculation unit 52 returns to step S55 and repeats each processing. In step S59, in a case where the sensing is completed (step S59: Yes), the calculation unit 52 starts the vehicle height control for controlling the vehicle height of the vehicle 10 so that the vehicle height of the vehicle 10 becomes a vehicle height (Hi) of the vehicle 10 stored in the storage unit 54 when the vehicle 10 enters the target position (step S60). The processing of step S60 is executed by the vehicle height control unit 58 of the calculation unit 52.

Next, the calculation unit 52 determines whether the vehicle height control of the vehicle 10 started in step S60 is completed, and determines whether the automatic exit of the vehicle 10 started in step S54 is completed (step S61). The processing of step S61 is executed by the vehicle height control unit 58 and the movement control unit 56 of the calculation unit 52.

In step S61, in a case where at least one of the vehicle height control of the vehicle 10 and the automatic exit control of the vehicle 10 is not completed (step S61: No), the calculation unit 52 repeats the processing in step S61 until the control is completed. In step S61, in a case where the vehicle height control of the vehicle 10 and the automatic exit control of the vehicle 10 are completed (step S61: Yes), the calculation unit 52 ends the entry processing.

As described above, according to the modification of the exit processing, the vehicle height control unit 58 controls the vehicle height of the vehicle 10 to the vehicle height (Hi) during the normal traveling when it is determined that the vehicle height control of the vehicle is possible even during the control of the automatic exit of the vehicle 10 and it is further determined that the sensing of the automatic exit is completed. Therefore, it is possible to start the vehicle height control of the vehicle 10 before the exit from the target position is completed, and completion waiting time of the vehicle height (Hi) control after the exit from the target position is completed may be reduced, thereby improving the convenience.

(Vehicle Height Control of Vehicle 10 at the Time of Entry)

Next, an example of the vehicle height control of the vehicle 10 at the time of automatic entry will be described with reference to FIG. 8.

Figure 8:
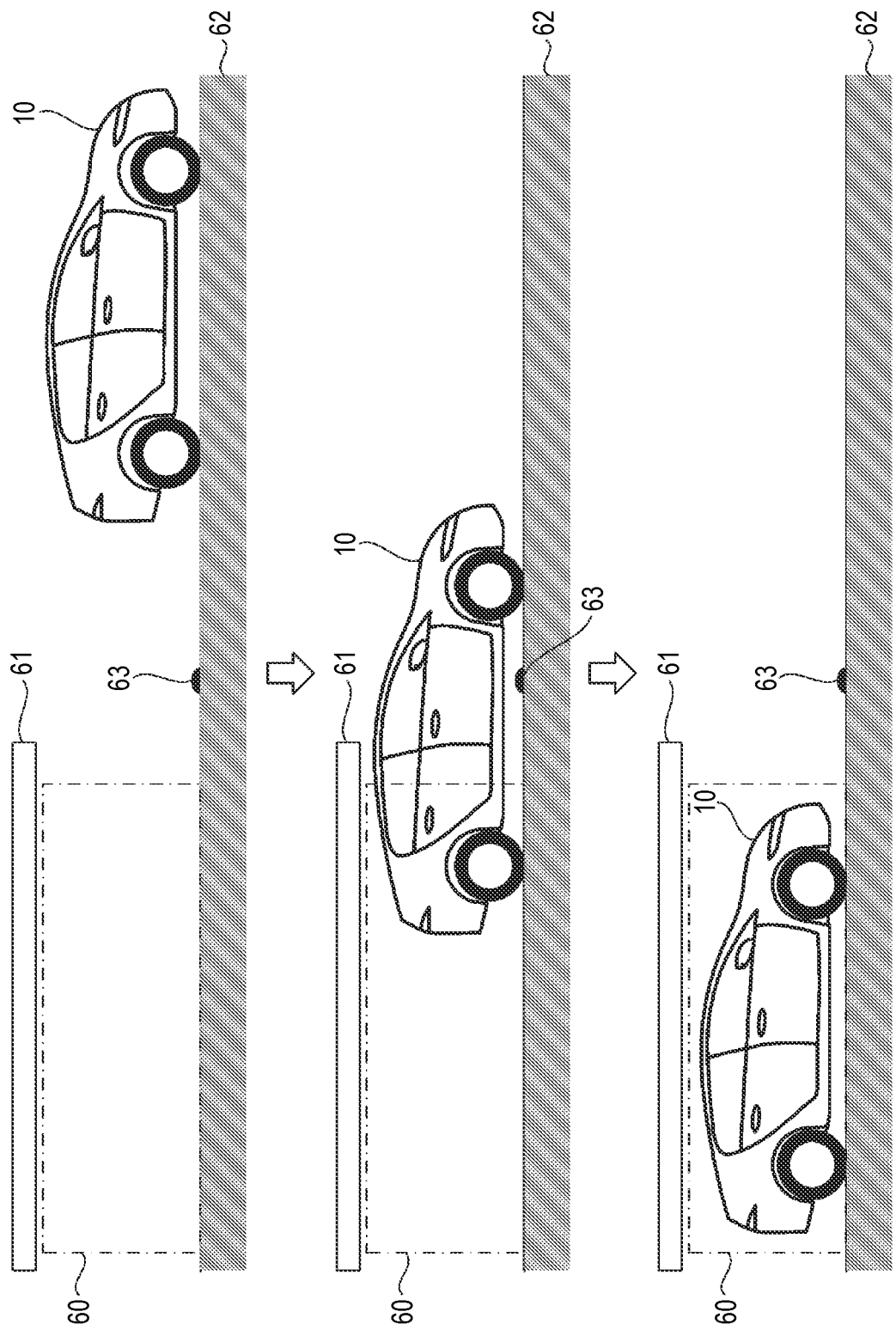
FIG. 8 shows an example of vehicle height control at the time of automatic entry of the vehicle.

The upper diagram in FIG. 8 is a diagram showing a state before the automatic entry of the vehicle 10 to a designated target position 60 is started. For example, it is assumed that the vehicle 10 ends normal traveling on a general road to arrive at a parking lot. When the vehicle 10 receives the automatic entry instruction for starting the automatic entry, the vehicle height (Hi), which is the vehicle height of the vehicle 10 adjusted during normal traveling of the vehicle 10, is stored in the storage unit 54. This corresponds to, for example, the processing from step S11 to step S12 in the entry processing described in FIG. 4 and the processing from step S31 to step S32 in the entry processing of the modification described in FIG. 6.

The middle diagram in FIG. 8 is a diagram showing a state in which the vehicle 10 is in the process of automatically entering the specified target position 60. After saving the vehicle height (Hi) in the storage unit 54, the vehicle 10 adjusts the vehicle height of the vehicle 10 to a vehicle height (Mid) suitable for automatic entry in consideration of a ceiling 61 of the target position 60 and a speed bump 63 provided in a traveling area 62 to the target position 60, and starts the automatic entry when the adjustment to the vehicle height (Mid) is completed. This corresponds to, for example, the processing from step S13 to step S15 in the entry processing described in FIG. 4 and the processing from step S33 to step S35 in the entry processing of the modification described in FIG. 6. The recognition target object such as the ceiling 61 or the speed bump 63 is an example of the surrounding target object in the present disclosure.

The lower diagram in FIG. 8 is a diagram showing a state in which the automatic entry of the vehicle 10 to the designated target position 60 is completed. When the automatic entry is completed, the vehicle 10 adjusts the vehicle height of the vehicle 10 to a vehicle height (Lo) suitable for the user to get on and off the vehicle 10. Since the automatic entry is completed, the vehicle height (Lo) is a vehicle height suitable for the user to get on and off regardless of a height of the speed bump 63 (it is not necessary to consider the height). This corresponds to, for example, the processing from step S16 to step S18 in the entry processing described in FIG. 4 and the processing from step S36 to step S38 in the entry processing of the modification described in FIG. 6.

In the example shown in the lower part of FIG. 8, the vehicle height of the vehicle 10 is adjusted to the vehicle height (Lo) after the vehicle 10 reaches the target position 60. However, for example, even before the vehicle 10 reaches the target position 60, when it is confirmed that the vehicle 10 has passed the position of the speed bump 63 and there is no obstacle such as a speed bump on the traveling area 62 of the vehicle 10 thereafter, the adjustment of changing the vehicle height of the vehicle 10 to the vehicle height (Lo) may be started. This corresponds to, for example, the processing from step S39 to step S42 in the entry processing of the modification described in FIG. 6.

(Vehicle Height Control of Vehicle 10 at the Time of Exit)

Next, an example of the vehicle height control of the vehicle 10 at the time of automatic exit will be described with reference to FIG. 9.

Figure 9:
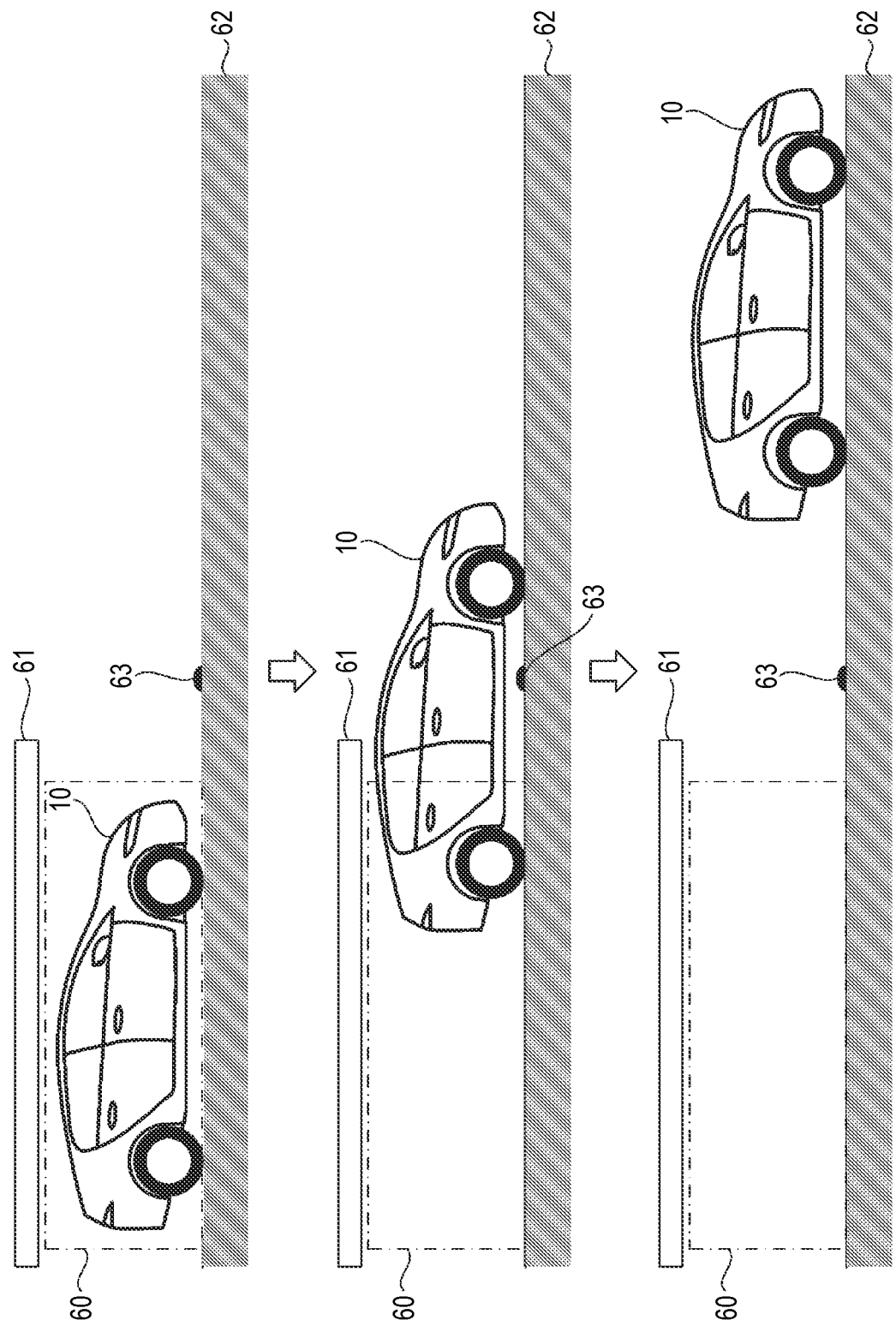
FIG. 9 shows an example of vehicle height control at the time of automatic exit of the vehicle.

The upper diagram in FIG. 9 is a diagram showing a state in which the vehicle 10 has entered the designated target position 60. The vehicle 10 is adjusted to, for example, the vehicle height (Lo) of the vehicle 10 at the completion of the automatic entry described in the lower part of FIG. 8, that is, the vehicle height suitable for the user to get on and off the vehicle 10. This corresponds to, for example, the processing of step S21 in the exit processing described in FIG. 5 and the processing of step S51 in the exit processing of the modification described in FIG. 7.

The middle diagram in FIG. 8 is a diagram showing a state in which the vehicle 10 is in the process of automatically exiting from the target position 60. Although the middle part of FIG. 8 shows a state in the middle of automatic exit, the vehicle 10 adjusts the vehicle height of the vehicle 10 to the vehicle height (Mid) suitable for the automatic exit in consideration of the vehicle heights of the ceiling 61 and the speed bump 63 before the automatic exit is started, and starts the automatic exit after the adjustment of the vehicle height (Mid) is completed. This corresponds to, for example, the processing from step S22 to step S24 in the exit processing described in FIG. 5 and the processing from step S52 to step S54 in the exit processing of the modification described in FIG. 7.

The lower diagram in FIG. 9 is a diagram showing a state in which the automatic exit of the vehicle 10 from the target position 60 is completed. When the automatic exit is completed, the vehicle 10 adjusts the vehicle height of the vehicle 10 to the vehicle height (Hi) during normal traveling. Since the automatic exit is completed, the vehicle height (Hi) is a vehicle height that is not related to the height of the ceiling 61 (it is not necessary to consider the height). This corresponds to, for example, the processing from step S25 to step S27 in the exit processing described in FIG. 5, and the processing from step S55 to step S57 in the exit processing of the modification described in FIG. 7.

In the example shown in the lower part of FIG. 9, the vehicle height of the vehicle 10 is adjusted to the vehicle height (Hi) after the vehicle 10 completes the automatic exit from the target position 60. However, for example, even before the automatic exit is completed, in a case where the vehicle 10 has left the position where the ceiling 61 is present, the adjustment to change the vehicle height of the vehicle 10 to the vehicle height (Hi) may be started. This corresponds to, for example, the processing from step S58 to step S61 in the exit processing of the modification described in FIG. 7.

In the example described above, the vehicle height of the vehicle 10 during normal traveling is defined as the vehicle height (Hi), the vehicle height suitable for the automatic entry/automatic exit is defined as the vehicle height (Mid) lower than the vehicle height (Hi), and the vehicle height suitable for the user to get on and off is defined as the vehicle height (Lo) lower than the vehicle height (Mid), but each vehicle height may be replaced depending on the vehicle.

(Change in Target Object Position with Change in Vehicle Height)

Figure 10:
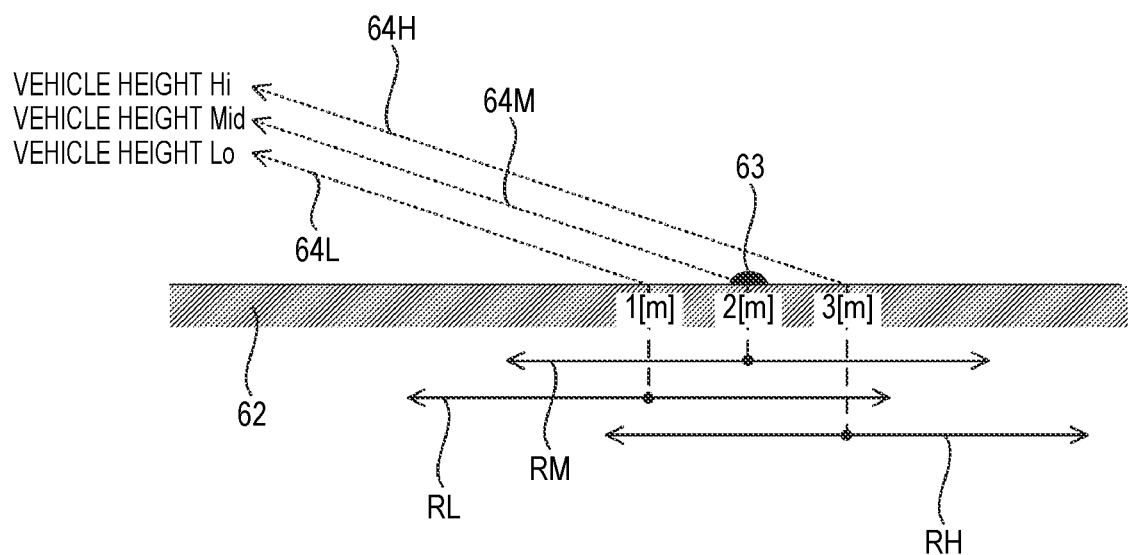
FIG. 10 shows a relationship between a change in a vehicle height and a change in a position where a surrounding target object appears.
Figure 11:
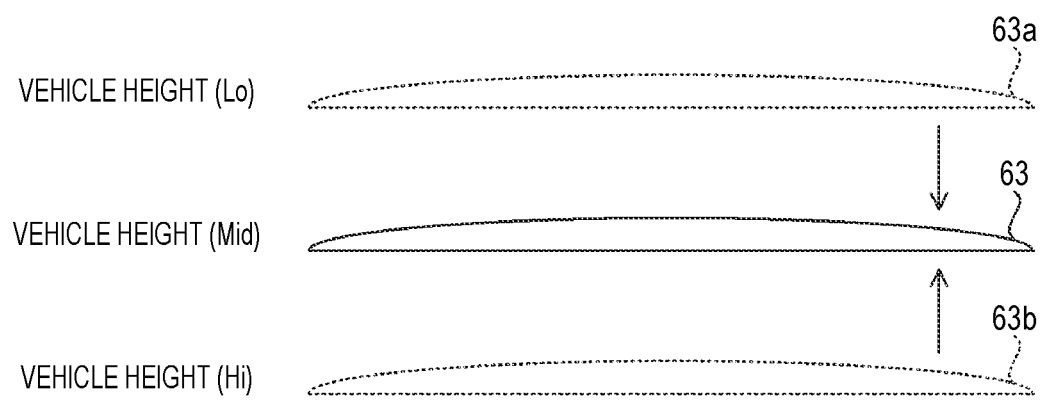
FIG. 11 illustrates a change in a vehicle height and correction of a position of a surrounding target object.

Next, a change in a position of a surrounding target object in the external environment recognition data acquired by a sensor such as a camera with a change in a vehicle height of the vehicle 10 will be described. FIG. 10 shows a relationship between a change in a vehicle height and a change in a position where a surrounding target object appears. FIG. 11 explains a change in a vehicle height and correction of a position of a surrounding target object.

As shown in FIG. 10, it is assumed that the vehicle height of the vehicle 10 changes to a vehicle height (Hi), a vehicle height (Mid), and a vehicle height (Lo). The vehicle height (Hi), the vehicle height (Mid), and the vehicle height (Lo) shown here are the same vehicle heights as the vehicle height (Hi), the vehicle height (Mid), and the vehicle height (Lo) in the vehicle height control described in FIGS. 8 and 9. In FIG. 10, "2 [m]" indicated at the position of the speed bump 63 provided in the traveling area 62 of the vehicle 10 indicates a distance from the vehicle 10 to the speed bump 63.

For example, it is assumed that the position of the speed bump 63 in the external environment recognition data acquired by the sensor group 16 of the vehicle 10 is detected at a position two meters away from the vehicle 10 when the vehicle height of the vehicle 10 is adjusted to the vehicle height (Mid). It is assumed that a sensing area of the external environment acquired by the sensor at this time is a sensing area RM centered on a position of an arrow line 64M, for example.

Here, it is assumed that the vehicle height of the vehicle 10 changes and decreases from the vehicle height (Mid) to the vehicle height (Lo). In this case, when the vehicle height decreases, the position of the sensor becomes lower in accordance with the change. However, even when the position of the sensor becomes lower, a sensing angle of the sensor does not change. Therefore, the sensing area of the external environment acquired by the sensor is closer to the front side (vehicle 10 side) than the sensing area RM at the vehicle height (Mid), for example, as indicated by a sensing area RL centered on a position of an arrow line 64L. Therefore, a detection position of the speed bump 63 in the external environment recognition data changes in a direction away from the vehicle 10.

On the other hand, it is assumed that the vehicle height of the vehicle 10 changes and increases from the vehicle height (Mid) to the vehicle height (Hi). In this case, when the vehicle height increases, the position of the sensor also becomes higher in accordance with the change. However, even when the position of the sensor becomes higher, the sensing angle of the sensor does not change. Therefore, the sensing area of the external environment acquired by the sensor moves away from the far side (side away from the vehicle 10) than the sensing area RM at the vehicle height (Mid), for example, as indicated by a sensing area RH centered on a position of an arrow line 64H. Therefore, the detection position of the speed bump 63 in the external environment recognition data changes in a direction of approaching the vehicle 10.

Specifically, as shown in FIG. 11, when the vehicle height of the vehicle 10 changes and degreases from the vehicle height (Mid) to the vehicle height (Lo), the position of the speed bump in the external environment recognition data is detected at the position of the speed bump 63 at the vehicle height (Mid), whereas the position of the speed bump in the external environment recognition data is detected at a position of a speed bump 63a farther than the speed bump 63 at the vehicle height (Lo). Therefore, the external environment recognition data is corrected for bringing the speed bump 63a close to the sensor (vehicle 10) so that even at the vehicle height (Lo), the position of the speed bump in the external environment recognition data becomes the same as the position of the speed bump 63 at the vehicle height (Mid). On the other hand, when the vehicle height of the vehicle 10 changes and increases from the vehicle height (Mid) to the vehicle height (Hi), the position of the speed bump in the external environment recognition data at the vehicle height (Hi) is detected at a position of a speed bump 63b closer than the position of the speed bump 63 at the vehicle height (Mid). Therefore, the external environment recognition data for moving the speed bump 63b away from the sensor (vehicle 10) is corrected so that even at the vehicle height (Hi), the position of the speed bump in the external environment recognition data becomes the same as the position of the speed bump 63 at the vehicle height (Mid).

(Correction Processing of Calculation Unit 52 at the Time of Automatic Movement)

Figure 12:
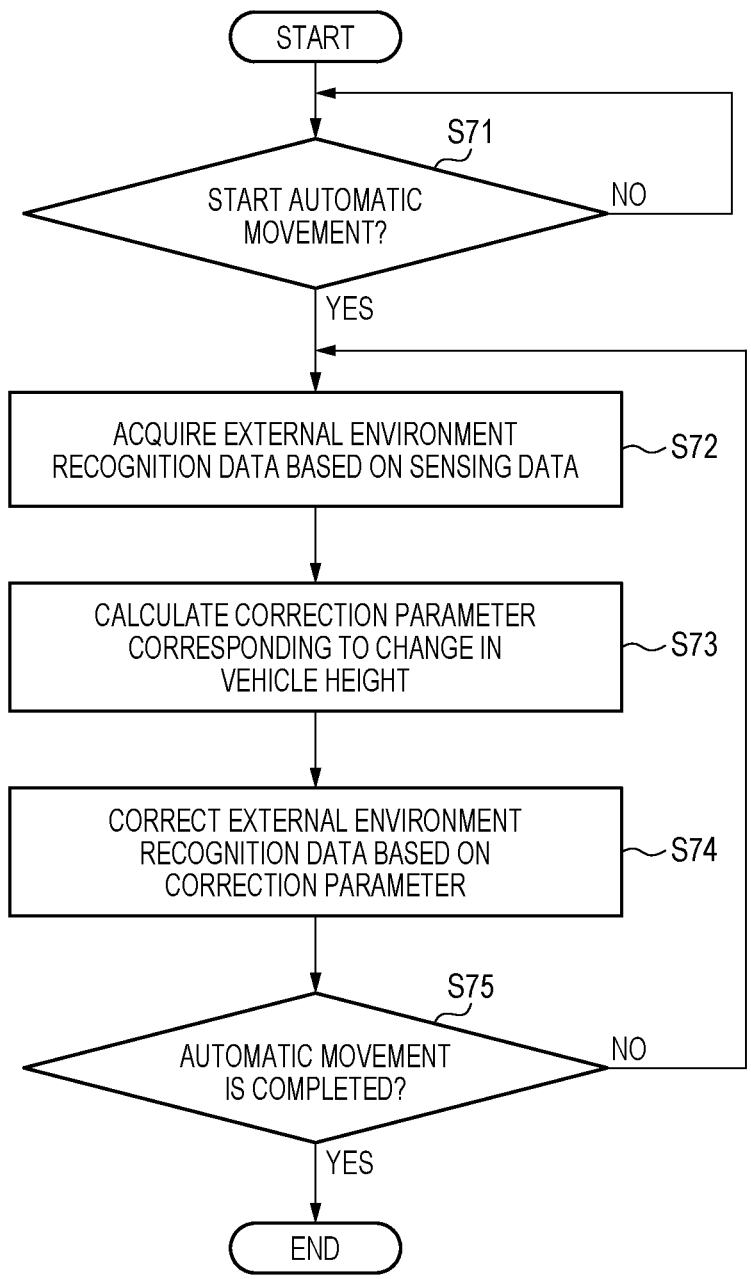
FIG. 12 is a flowchart showing correction processing of external environment recognition data performed by the calculation unit.

Next, correction processing of the calculation unit 52 at the time of automatic movement of the vehicle 10 will be described. FIG. 12 is a flowchart showing correction processing of external environment recognition data performed by the calculation unit 52. Upon receiving the entry start operation or the exit start operation from the user, the calculation unit 52 starts the correction processing shown in FIG. 12. As described above, the entry start operation is an operation of the automatic entry button, and the exit start operation is an operation of the automatic exit button.

First, the calculation unit 52 determines whether the automatic movement of the vehicle 10 is started (step S71). The automatic movement is started when, for example, the entry start operation or the exit start operation is received as in the start of the correction processing. The processing of step S71 is executed by the movement control unit 56 of the calculation unit 52.

In step S71, in a case where the automatic movement is not started, that is, in a case where the entry start operation and the exit start operation are not received (step S71: No), the calculation unit 52 repeats the processing in step S71. In step S71, in a case where the automatic movement is started, that is, in a case where the entry start operation or the exit start operation is received (step S71: Yes), the calculation unit 52 acquires the external environment recognition data of the vehicle 10 based on the sensing data acquired by the sensors such as the front camera 12Fr, the rear camera 12Rr, the left side camera 12L, and the right side camera 12R (step S72).

Next, the calculation unit 52 detects the current vehicle height of the vehicle 10, and in a case where the vehicle height has changed, the calculation unit 52 calculates a correction parameter corresponding to the change in the vehicle height (step S73). As described above, when the correction of the external environment recognition data is performed by enlargement or reduction, the correction parameter includes, for example, a parameter such as an enlargement ratio or a reduction ratio. The correction parameter is calculated from a vehicle height calculated according to vehicle height adjustment time by the air suspension, for example. The correction parameter may be calculated from a vehicle height calculated based on the feedback value of the adjustment amount from the vehicle height adjustment unit 140.

Next, the calculation unit 52 corrects the external environment recognition data acquired in step S72 based on the correction parameter calculated in step S73 (step S74). For example, when the vehicle height of the vehicle 10 changes and decreases, the calculation unit 52 corrects the external environment recognition data in the direction in which the surrounding target object represented by the external environment recognition data approaches the vehicle 10. When the vehicle height of the vehicle 10 changes and increases, the calculation unit 52 corrects the external environment recognition data in the direction in which the surrounding target object represented by the external environment recognition data moves away from the vehicle 10. When there is no change in the vehicle height of the vehicle 10, the external environment recognition data is corrected with a correction parameter without correction (correction value=0). The processing of steps S72. S73, and S74 is executed by the external environment recognition unit 55 of the calculation unit 52.

Next, the calculation unit 52 determines whether the automatic movement of the vehicle 10 started in step S71 is completed (step S75). The processing of step S75 is executed by the movement control unit 56 of the calculation unit 52.

In step S75, in a case where the automatic movement of the vehicle 10 is not completed (step S75: No), the calculation unit 52 returns to step S72 and repeats each processing. In step S75, in a case where the automatic movement of the vehicle 10 is completed (step S75: Yes), the calculation unit 52 ends the correction processing.

The movement control unit 56 performs the movement control of the vehicle 10 with reference to the external environment recognition data corrected in step S74. The display 30) control unit 59 displays a surrounding image (for example, top view image) on the touch panel 42 of the navigation device 18 or an information terminal such as a smartphone with reference to the external environment recognition data corrected in step S74. When there is no change in the vehicle height, the movement control unit 56 and the display control unit 59 may skip the correction processing of step S74 and refer to the external environment recognition data without correction.

(Top View Image Displayed on Information Terminal)

Figure 13:
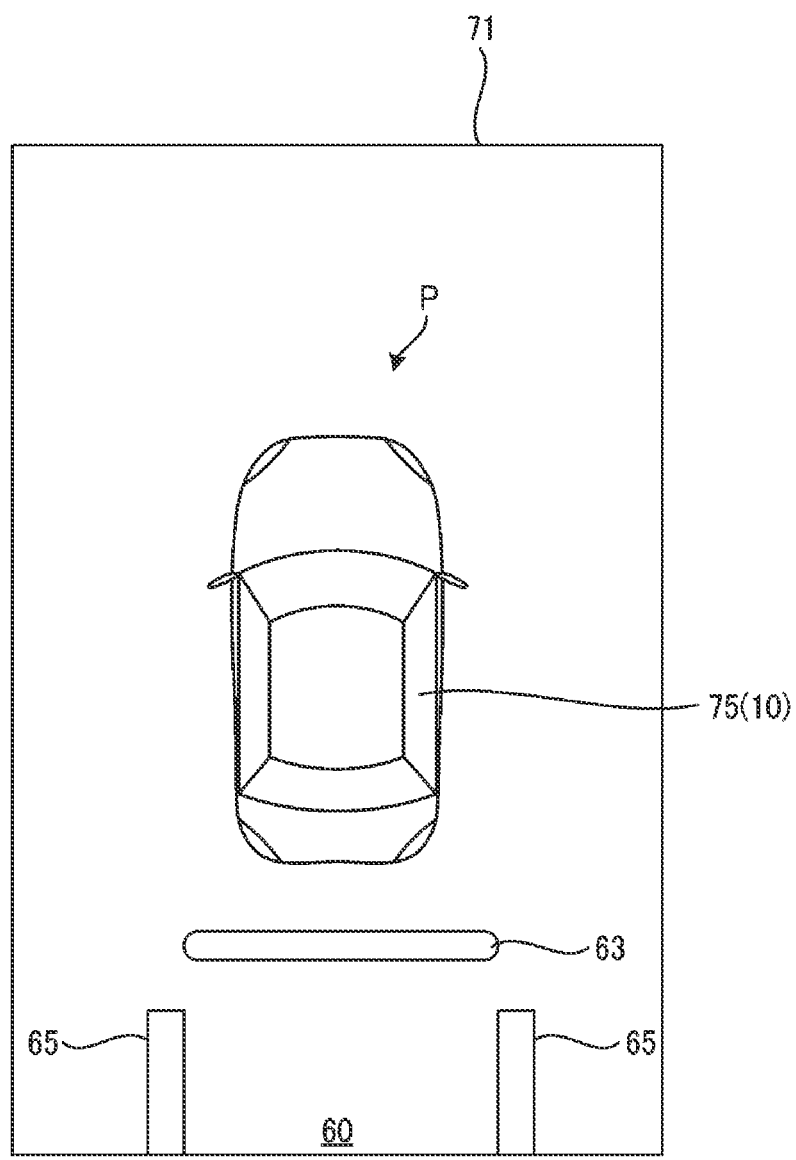
FIG. 13 shows an example of a top view image when the vehicle automatically enters a target position.
Figure 14:
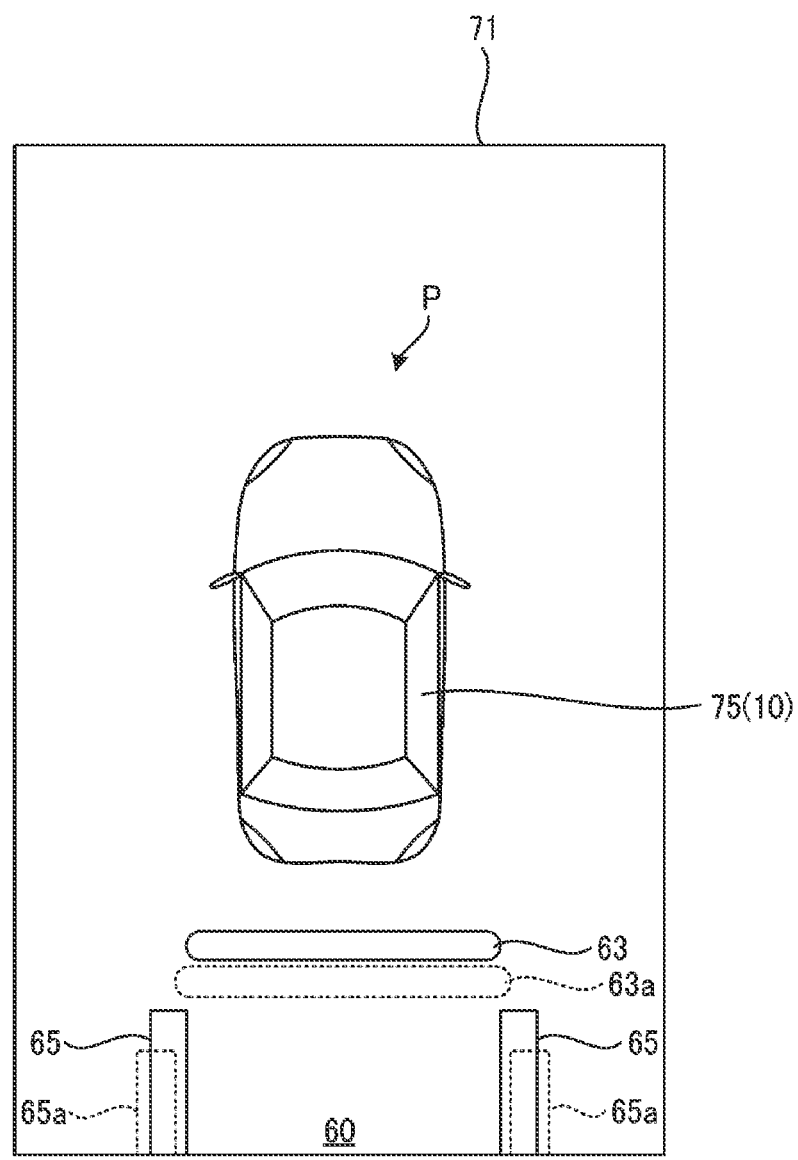
FIG. 14 shows an example of a top view image when the height of the vehicle changes from that in FIG. 13.

Next, a top view image displayed on the information terminal when the vehicle height of the vehicle 10 changes will be described. FIG. 13 shows an example of a top view image 71 when the vehicle 10 automatically enters the target position 60 of a parking lot P. FIG. 14 shows an example of the top view image 71 when the vehicle height of the vehicle 10 changes from that shown in FIG. 13.

As shown in FIG. 13, a white line 65 that defines the target position 60 is displayed at the target position 60 that the vehicle 10 enters. The speed bump 63 is provided in a region from a position where the vehicle 10 is stopped to the target position 60 (on the front side of the target position 60). The vehicle 10 shown in the top view image 71 of FIG. 13 is the vehicle 10 in the state described in the upper diagram of FIG. 8. That is, the vehicle 10 is in a state when the vehicle height (Hi), which is a vehicle height adjusted during normal traveling of the vehicle 10, is stored in the storage unit 54 after receiving the automatic entry instruction to start the automatic entry. The vehicle displayed in the top view image 71 is an image showing a state where the vehicle 10 is viewed from above, and is a vehicle image 75 generated (captured) in advance and stored in the storage unit 54 or the like. A target position frame surrounding the target position 60 may be displayed at the target position 60 that the vehicle 10 enters, instead of the white line 65.

The vehicle 10 shown in the top view image 71 of FIG. 14 is the vehicle 10 in the state described in the middle diagram of FIG. 8. That is, the vehicle 10 is in a state in which the vehicle height is changed from the vehicle height (Hi) state (state of FIG. 13) to the vehicle height (Mid) suitable for automatic entry of the vehicle 10 in consideration of the ceiling 61 (not shown) of the target position 60 and the speed bump 63 provided in the region up to the target position 60. By changing the vehicle height of the vehicle 10 from the vehicle height (Hi) to the vehicle height (Mid) to decrease the vehicle height, the position of the sensor such as the camera mounted on the vehicle 10 also becomes lower, and thus a deviation occurs in a detection position of a surrounding target object in the external environment recognition data acquired by the sensor. As shown in FIG. 14, the positions of the speed bump 63 and the white line 65 indicated by solid lines change in the direction away from the vehicle 10, and are displayed at the positions of the speed bump 63*a* and a white line 65*a* indicated by broken lines. Therefore, the calculation unit 52 of the vehicle 10 corrects the external environment recognition data such that the positions of the speed bump 63*a* and the white line 65*a* in the external environment recognition data are displayed at the positions of the speed bump 63 and the white line 65, that is, in the direction in which the surrounding target object represented by the external environment recognition data approaches the vehicle 10. Specifically, when the vehicle height of the vehicle 10 decreases, the external environment recognition data is corrected such that the top view image 71 is reduced centering on the vehicle 10. The calculation unit 52 generates the top view image 71 based on the corrected external environment recognition data, and displays the corrected top view image 71 on the information terminal.

As described above, the external environment recognition unit 55 of the calculation unit 52 corrects the external environment recognition data in the direction in which the surrounding target object represented by the external environment recognition data approaches the vehicle 10 when the vehicle height decreases by the vehicle height control of the vehicle 10 performed by the vehicle height control unit 58 during the execution of the movement control of the vehicle 10, and corrects the external environment recognition data in the direction in which the surrounding target object represented by the external environment recognition data moves away from the vehicle 10 when the vehicle height increases by the vehicle height control of the vehicle 10 performed by the vehicle height control unit 58 during the execution of the movement control of the vehicle 10. Therefore, even when the vehicle height of the vehicle 10 changes during the movement control of the vehicle 10, the external environment recognition data may be corrected to external environment recognition data corresponding to the change in the vehicle height, and thus the surrounding image of the vehicle 10 may be appropriately generated based on the external environment recognition data corresponding to the vehicle height.

The display control unit 59 of the calculation unit 52 may display the top view image 71 (surrounding image) of the vehicle 10 based on the external environment recognition data corrected in accordance with the vehicle height on the information terminal carried by the user of the vehicle 10.

The embodiment of the present disclosure has been described above, but the present disclosure is not limited to the embodiment described above, and modifications, improvements, and the like may be made as appropriate.

For example, in the above embodiment, explanation has been given regarding a case in which the vehicle 10 automatically enters and exits the parking space by automatic steering. For example, the present disclosure may be applied to guidance entry assistance and guidance exit assistance for guiding the vehicle 10 to enter and exit a parking space by the operation of the driver.

The control method described in the embodiment described above may be implemented by executing a control program prepared in advance by a computer. The present control program is recorded in a computer-readable storage medium and executed by being read from the storage medium. Further, the present control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

In the present specification, at least the following matters are described. Although corresponding constituent elements or the like in the above-described embodiment are shown in parentheses, the present invention is not limited thereto.

(1) A control device (calculation unit 52) of a moving body (vehicle 10), the control device including:
an external environment recognition unit (external environment recognition unit 55) configured to acquire external environment recognition data of the moving body;
a movement control unit (movement control unit 56) configured to perform movement control of the moving body based on the external environment recognition data; and
a moving body height detection unit (moving body height detection unit 57) configured to detect a moving body height of the moving body, in which
the external environment recognition unit corrects the external environment recognition data in accordance with a change in the moving body height while the movement control is performed.

According to (1), since the external environment recognition data of the moving body may be corrected to the external environment recognition data in accordance with the change in the moving body height (vehicle height) even when the vehicle height changes while the moving body moves, the external environment of the moving body may be appropriately recognized.

(2) The control device according to (1), in which
the movement control unit performs the movement control based on the external environment recognition data corrected in accordance with the change in the moving body height.

As in (2), since the movement control of the moving body is performed based on the corrected external environment recognition data in accordance with the change in the moving body height of the moving body, it is possible to perform more accurate movement control of the moving body.

(3) The control device according to (1) or (2), further including:
a display control unit (display control unit 59) configured to display an image based on the external environment recognition data, in which
the display control unit displays the image based on the external environment recognition data corrected in accordance with the change in the moving body height.

According to (3), since the image is displayed based on the corrected external environment recognition data in accordance with the change in the vehicle height of the moving body, an appropriate image may be displayed even when the vehicle height changes.

(4) The control device according to (3), in which
the display control unit displays at least one of an image indicating a target position of the movement control or an image indicating a surrounding target object around the moving body, based on the external environment recognition data.

As in (4), a target object displayed as an image at the time of movement control of the moving body may preferably be a target position of the moving body, a surrounding target object, or the like.

(5) The control device according to any one of (1) to (4), in which
the external environment recognition unit
corrects, in response to the moving body height decreasing, the external environment recognition data such that a target object represented by the external environment recognition data approaches the moving body, and
corrects, when the moving body height increasing, the external environment recognition data such that the target object moves away from the moving body.
According to (5), it is possible to appropriately generate the surrounding image of the moving body by correcting a position of a target object with respect to the moving body in accordance with the change in the vehicle height to change in this manner.

(6) The control device according to any one of (1) to (5), further including:
a moving body height control unit (moving body height control unit 58) configured to perform moving body height control of the moving body, in which
the external environment recognition unit corrects the external environment recognition data corresponding to the moving body height control while the movement control is performed.

According to (6), since the external environment recognition data of the moving body may be corrected to the external environment recognition data in accordance with the vehicle height control of the vehicle height even when the vehicle height changes during the movement control of the moving body, it is possible to appropriately generate the surrounding image of the moving body based on the external environment recognition data.

(7) The control device according to (6), in which
the moving body height detection unit detects the moving body height of the moving body based on elapsed time from start of the moving body height control.

According to (7), it is possible to appropriately correct the external environment recognition data based on the vehicle height of the moving body detected from the elapsed time of the vehicle height control.

(8) The control device according to (6) or (7), in which
the moving body height control unit performs the moving body height control in accordance with progress of the movement control.

According to (8), since the height control of the moving body is performed in conjunction with the movement control for moving the moving body to the target position such as a parking place, it is possible to appropriately adjust the height of the moving body when moving to the target position, and for example, it is possible to improve convenience for a user to get on and off the moving body.

(9) The control device according to (8), in which
the moving body height control unit
performs first moving body height control of the moving body based on the external environment recognition data before starting the movement control, and
starts second moving body height control of the moving body, which is different from the first moving body height control, in response to completion of the movement control or while the movement control is performed.

According to (9), it is possible to control the height of the moving body to an appropriate height according to a movement state of the moving body.

(10) The control device according to (9), in which
the first moving body height control is moving body height control to adjust the moving body height of the moving body to a height at which the movement control is possible, and
the second moving body height control is moving body height control to adjust the moving body height of the moving body to a height more suitable for a user to get on and off the moving body than the height at which the movement control is possible.

According to (10), it is possible to control the height of the moving body to an appropriate height respectively at the time of the movement control of the moving body and when the user gets on and off the moving body.

(11) The control device according to (9) or (10), in which
the movement control unit performs the movement control for moving the moving body from a target position of the movement control, and
the moving body height control unit
stores a height of the moving body before starting the first moving body height control, and
performs moving body height control to adjust the moving body height of the moving body to the stored height in response to completion of the movement control for moving the moving body from the target position.

According to (11), when the movement control of the moving body is completed, it is possible to automatically return the height to an original height different from the height during the movement control, so that an instruction of height adjustment by the user becomes unnecessary, and the convenience is improved.

(12) A control method performed by a control device, the control device including an external environment recognition unit configured to acquire external environment recognition data of a moving body, a movement control unit configured to perform movement control of the moving body based on the external environment recognition data, and a moving body height detection unit configured to detect a moving body height of the moving body, the control method including:
correcting the external environment recognition data in accordance with a change in the moving body height while the movement control is performed.

According to (12), since the external environment recognition data of the moving body may be corrected to the external environment recognition data in accordance with the change in the moving body height (vehicle height) even when the vehicle height changes while the moving body moves, the external environment of the moving body may be appropriately recognized.

(13) A non-transitory computer readable storage medium storing a control program causing a processor of a control device to execute a process, the control device including an external environment recognition unit configured to acquire external environment recognition data of a moving body, a movement control unit configured to perform movement control of the moving body based on the external environment recognition data, and a moving body height detection unit configured to detect a moving body height of the moving body, the process including:

correcting the external environment recognition data in accordance with a change in the moving body height while the movement control is performed.

According to (13), since the external environment recognition data of the moving body may be corrected to the external environment recognition data in accordance with the change in the moving body height (vehicle height) even when the vehicle height changes while the moving body moves, the external environment of the moving body may be appropriately recognized.

What is claimed is:

1. A control device of a moving body, the control device comprising:
   a processor configured to
      acquire external environment recognition data of the moving body,
      perform movement control of the moving body based on the external environment recognition data, and
      detect a moving body height of the moving body,
   wherein the processor
      corrects the external environment recognition data in accordance with a change in the moving body height while the movement control is performed,
      corrects, in response to the moving body height decreasing, the external environment recognition data such that a target object represented by the external environment recognition data approaches the moving body, and
      corrects, when the moving body height increasing, the external environment recognition data such that the target object moves away from the moving body.

2. The control device according to claim 1, wherein the processor performs the movement control based on the external environment recognition data corrected in accordance with the change in the moving body height.

3. The control device according to claim 1, wherein the processor is further configured to
   control to display an image based on the external environment recognition data, and
   control to display the image based on the external environment recognition data corrected in accordance with the change in the moving body height.

4. The control device according to claim 3, wherein
   the processor controls to display at least one of an image indicating a target position of the movement control or an image indicating a surrounding target object around the moving body, based on the external environment recognition data.

5. The control device according to claim 1, wherein the processor is further configured to
   perform moving body height control of the moving body, and
   correct the external environment recognition data corresponding to the moving body height control while the movement control is performed.

6. The control device according to claim 5, wherein
   the processor is further configured to detect the moving body height of the moving body based on elapsed time from start of the moving body height control.

7. The control device according to claim 5, wherein
   the processor performs the moving body height control in accordance with progress of the movement control.

8. The control device according to claim 7, wherein
   the processor
      performs first moving body height control of the moving body based on the external environment recognition data before starting the movement control, and
      starts second moving body height control of the moving body, which is different from the first moving body height control, in response to completion of the movement control or while the movement control is performed.

9. The control device according to claim 8, wherein
   the first moving body height control is moving body height control to adjust the moving body height of the moving body to a height at which the movement control is possible, and
   the second moving body height control is moving body height control to adjust the moving body height of the moving body to a height more suitable for a user to get on and off the moving body than the height at which the movement control is possible.

10. The control device according to claim 8, wherein
    the processor
       performs the movement control for moving the moving body from a target position of the movement control,
       stores a height of the moving body before starting the first moving body height control, and
       performs moving body height control to adjust the moving body height of the moving body to the stored height in response to completion of the movement control for moving the moving body from the target position.

11. A control method performed by a control device, the control device including a processor configured to acquire external environment recognition data of a moving body, perform movement control of the moving body based on the external environment recognition data, and detect a moving body height of the moving body, the control method comprising:
    correcting the external environment recognition data in accordance with a change in the moving body height while the movement control is performed;
    correcting, in response to the moving body height decreasing, the external environment recognition data such that a target object represented by the external environment recognition data approaches the moving body, and
    correcting, when the moving body height increasing, the external environment recognition data such that the target object moves away from the moving body.

12. A non-transitory computer readable storage medium storing a control program causing a processor of a control device to execute a process, the control device including a processor configured to acquire external environment recognition data of a moving body, perform movement control of the moving body based on the external environment recognition data, and detect a moving body height of the moving body, the process comprising:
    correcting the external environment recognition data in accordance with a change in the moving body height while the movement control is performed;

correcting, in response to the moving body height decreasing, the external environment recognition data such that a target object represented by the external environment recognition data approaches the moving body, and correcting, when the moving body height increasing, the external environment recognition data such that the target object moves away from the moving body.

\* \* \* \* \*